United States Patent
Tominaga et al.

[11] Patent Number: 6,137,795
[45] Date of Patent: Oct. 24, 2000

[54] CELL SWITCHING METHOD AND CELL EXCHANGE SYSTEM

[75] Inventors: Susumu Tominaga; Shinji Michii, both of Kawasaki, Japan

[73] Assignee: Fujitsu Limited, Kanagawa, Japan

[21] Appl. No.: 08/925,420

[22] Filed: Sep. 8, 1997

[30] Foreign Application Priority Data

Mar. 19, 1997 [JP] Japan ................................ 9-066396

[51] Int. Cl.⁷ .......................... H04L 12/56; H04Q 11/00
[52] U.S. Cl. ......................... 370/375; 370/398; 370/415
[58] Field of Search .................................. 370/232, 394, 370/395, 412, 413, 415, 375, 398, 399

[56] References Cited

U.S. PATENT DOCUMENTS

| | | | |
|---|---|---|---|
| 4,910,731 | 3/1990 | Sakurai et al. | 370/413 |
| 4,956,839 | 9/1990 | Torii et al. | 370/232 |
| 5,099,475 | 3/1992 | Kozaki et al. | 370/422 |

FOREIGN PATENT DOCUMENTS

| | | |
|---|---|---|
| 0 244 544 | 11/1987 | European Pat. Off. . |
| 52-005202 | 1/1977 | Japan . |
| 52-005203 | 1/1977 | Japan . |
| 53-096615 | 8/1978 | Japan . |
| 53-114303 | 10/1978 | Japan . |
| 54-075956 | 6/1979 | Japan . |
| 55-014742 | 2/1980 | Japan . |
| 55-066021 | 5/1980 | Japan . |
| 59-112327 | 6/1984 | Japan . |
| 59-133754 | 8/1984 | Japan . |
| 60-174548 | 9/1985 | Japan . |
| 61-70836 | 4/1986 | Japan . |
| 61-142831 | 6/1986 | Japan . |
| 61-148934 | 7/1986 | Japan . |
| 61-148935 | 7/1986 | Japan . |
| 61-257043 | 11/1986 | Japan . |
| 62-030500 | 2/1987 | Japan . |
| 63-287142 | 11/1988 | Japan . |
| 1-085439 | 3/1989 | Japan . |
| 2-189049 | 7/1990 | Japan . |
| 2-278942 | 11/1990 | Japan . |
| 4-081032 | 3/1992 | Japan . |
| 4-96544 | 3/1992 | Japan . |
| 4-151920 | 5/1992 | Japan . |
| 4-369143 | 12/1992 | Japan . |
| 5-068044 | 3/1993 | Japan . |
| 6-030020 | 2/1994 | Japan . |
| 6-177903 | 6/1994 | Japan . |
| 6-276215 | 9/1994 | Japan . |
| 7-050676 | 2/1995 | Japan . |
| 7-058752 | 3/1995 | Japan . |
| 8-149135 | 6/1996 | Japan . |

*Primary Examiner*—Hassan Kizou
*Assistant Examiner*—John Pezzlo
*Attorney, Agent, or Firm*—Helfgott & Karas, P.C.

[57] ABSTRACT

A plurality of cell switches that operate at a basic switching rate are provided, and a unit including (FIFO buffers) for queuing cells from the transmission line are provided in correspondence with respective ones of the cell switches. Cells from the transmission line are demultiplexed and written to the prescribed FIFO buffer by a cell demultiplexer, cells are read out of each FIFO buffer at the basic switching rate and entered into the corresponding cell switch, and cells switched by each of the cell switches are multiplexed and sent to a transmission line by a multiplexer.

7 Claims, 23 Drawing Sheets

CELL SWITCHING METHOD AND CELL EXCHANGE SYSTEM

BACKGROUND OF THE INVENTION

This invention relates to a cell switching method and cell exchange system. More particularly, the invention relates to a cell switching method and cell exchange system for switching cells by accommodating high-speed transmission lines having transmission rates higher than the basic switching rate of cell switches.

There is increasing demand not only for voice communication and data communication but also for multimedia communication in which moving pictures are transmitted as well as audio and data. B-ISDN (broadband-ISDN) switching technology, which is based upon an asynchronous transfer mode (ATM), is available as a means for realizing broadband communication. In ATM transmission, all information is transferred at high speed upon being disassembled into fixed-length information referred to as cells. More specifically, in ATM transmission, logical links are multiplexed on a physical line to thereby allocate the line to a plurality of calls. Moving-picture data or audio data from a terminal corresponding to each call are broken down into fixed-length information units (referred to as "ATM cells"), and the cells are transmitted over a line sequentially to realize multiplexing.

As shown in FIG. 19, an ATM cell is composed of a fixed-length block of 53 bytes of which five bytes constitute a header and 48 bytes an information field (payload). In order that the destination will be understood even after data is disassembled into blocks, the header includes a virtual channel identifier (VCI) for call identifying purposes. The header HD further includes a virtual path identifier (VPI) that specifies another path, a generic flow control (GFC) used in flow control between links, payload type (PT), cell loss priority (CLP) and a header error control (HEC), which is a code for correcting errors in the header.

FIG. 20 is a block diagram illustrating the configuration of an ATM switching system. Shown in FIG. 20 are subscriber interfaces (or line IFs) $11_{11}$~$11_{1n}$, $11_{21}$~$11_{2n}$, $11_{31}$~$11_{3n}$, $11_{41}$~$11_{4n}$ connected to corresponding trunk lines (transmission lines), multiplexer/demultiplexers $12_1$~$12_4$, an ATM switch unit 13, a system controller 14 and a maintenance terminal 15. The ATM switch unit 13 is connected to the plurality of multiplexer/demultiplexers $12_1$~$12_4$, switches input cells from certain multiplexer/demultiplexers and outputs the cells to prescribed multiplexer/demultiplexers. The multiplexer/demultiplexers $12_1$~$12_4$, which are connected to the pluralities of subscriber interfaces $11_{11}$~$11_{1n}$, $11_{21}$~$11_{2n}$, $11_{31}$~$11_{3n}$, $11_{41}$~$11_{4n}$, respectively, multiplex outgoing cells from a plurality of subscriber interfaces IF and output the cells to the ATM switch unit 13. Furthermore, the multiplexer/demultiplexers $12_1$~$12_4$ demultiplex and output incoming cells, which arrive from the ATM switch unit 13, to the pertinent subscriber interfaces.

The subscriber interfaces $11_{11}$~$11_{4n}$, which are connected to the corresponding multiplexer/demultiplexers $12_1$~$12_4$, each extract an ATM cell (FIG. 19) from the payload of a frame of a prescribed format (e.g. a SONET frame) that has entered from the transmission line, convert the cell to one having the cell format within the switch and output the cell to the multiplexer/demultiplexer. As shown in FIG. 21, the cell format within the switch has a construction obtained by additionally providing the ATM cell with, say, one byte, several bits of which are used to write tag information TAG for routing purposes. The ATM switch unit 13 routes a cell to a prescribed path by referring to this tag information TAG, which has been introduced by a VC converter (not shown).

Furthermore, the subscriber interfaces $11_{11}$~$11_{4n}$ convert the cells of the switch cell format (FIG. 21) that enter from the multiplexer/demultiplexers $12_1$~$12_4$ to cells having the ATM cell format (FIG. 19), map each ATM cell to the payload of the SONET frame and send the ATM cell to the line side. The system controller 14 controls the subscriber interfaces $11_{11}$~$11_{4n}$, multiplexer/demultiplexers $12_1$~$12_4$ and ATM switch unit 13.

FIG. 22 is a diagram for describing an ATM switch of the self-routing type. The ATM switch unit 13 includes tag information detection circuits $I_1$~$I_3$, transmission information delay circuits $D_1$~$D_3$, demultiplexers $DM_1$~$DM_3$ and tag information decoding circuits $DEC_1$~$DEC_3$, which construct a cell distribution unit CELD, buffer memories such as FIFO (first-in, first-out) memories $FM_{11}$~$FM_{33}$, selectors $SEL_1$~$SEL_3$, and arrival order management FIFOs $AOM_1$~$AOM_3$. Each arrival order management FIFO ($AOM_1$~$AOM_3$) is connected to the output terminals of the information decoding circuits $DEC_1$~$DEC_3$ and stores the order in which cells arrive at the corresponding three buffer memories $FM_{11}$~$FM_{13}$, $FM_{21}$~$FM_{23}$, $FM_{31}$~$FM_{33}$. These FIFOs control the corresponding selectors $SEL_1$~$SEL_3$ so that cells are read out of the three buffer memories in the order of cell arrival and sent to outgoing lines #1~#3.

A cell which enters the ATM switch unit 1 has the structure shown in FIG. 21. The detection circuits $I_i$(i=1~3) extract the tag information TAG contained in the input signal and send the information to the decoder circuits $DEC_i$ (i=1~3). If the entering tag information TAG indicates the output terminal #j (j=1~3), the decoder circuit $DEC_i$ operates the demultiplexer $DM_i$ by a changeover signal $S_i$ to send the transmission information to the FIFO memory $FM_{ji}$. For example, if the tag TAG contained in the cell which has entered from the input terminal #1 indicates output terminal #2, the decoder circuit $DEC_1$ operates the demultiplexer $DM_1$ so that the information from the input terminal #1 enters FIFO $FM_{21}$.

The arrival order management FIFOs ($AOM_i$~$AOM_3$) are each connected to the output terminals of the tag information decoding circuits $DEC_1$~$DEC_3$ and store the order in which cells arrive at the corresponding three buffer memories $FM_{11}$~$FM_{33}$, $FM_{21}$~$FM_{23}$, $FM_{31}$~$FM_{33}$. For example, if cells arrive in the order of buffer memories $FM_{11}$→$FM_{12}$→$FM_{13}$→$FM_{12}$→ . . . , buffer memory identification codes are stored in the arrival order management FIFOs ($AOM_i$~$AOM_3$) in the order of cell arrival, i.e., in the manner 1→2→3→2→ . . . . Thereafter, the arrival order management FIFOs ($AOM_i$~$AOM_3$) control the corresponding selectors $SEL_1$~$SEL_3$ so that cells are read out of the three buffer memories $FM_{11}$~$FM_{33}$, $FM_{21}$~$FM_{23}$, $FM_{31}$~$FM_{33}$ in the order of cell arrival and are sent to the outgoing lines #1~#3.

A buffer function is thus obtained by providing each buffer memory $FM_{ij}$ with a capacity equivalent to a plurality of cells. This makes it possible to deal satisfactorily with a case in which there is a temporary increase in transmission data. Further, since cells are read out of the buffer memories $FM_{i1}$~$FM_{i3}$ ($FM_{11}$~$FM_{33}$, $FM_{21}$~$FM_{23}$, $FM_{31}$~$FM_{33}$) in the order of cell arrival, equal numbers of cells reside in the buffer memories $FM_{i1}$~$FM_{i3}$. This makes it possible to eliminate situations in which cells are lost owing to overflow of the buffer memories.

A buffering function is thus obtained by providing each buffer memory $FM_{ij}$ with a capacity equivalent to a plurality of cells. This makes it possible to deal satisfactorily with a case in which there is a temporary increase in transmission data. Further, since cells are read out of the buffer memories $FM_{i1} \sim FM_{i3}$ ($FM_{11} \sim FM_{33}$, $FM_{21} \sim FM_{23}$, $FM_{31} \sim FM_{33}$) in the order of cell arrival, equal numbers of cells reside in the buffer memories $FM_{i1} \sim FM_{i3}$. This makes it possible to eliminate situations in which cells are lost owing to overflow of the buffer memories.

FIG. 23 is a block diagram illustrating the overall construction of a cell exchange system accommodating high-speed transmission lines having various transmission rates. The system is divided into transmitting and receiving sections. The system includes the ATM switch unit 13, which has n-number of cell switches having a basic switching rate of 622 Mbps. The system further includes a line trunk (LT) receiver 16a connected to a transmission line having a transmission rate of 622 Mbps, an LT transmitter 16b connected to a transmission line having a transmission rate of 622 Mbps, LT receivers $17_{a1} \sim 17_{an}$ connected to transmission lines each having a transmission rate of 156 Mbps, and LT transmitters $17_{b1} \sim 17_{bn}$ connected to transmission lines each having a transmission rate of 156 Mbps.

The LT receiver 16a and LT transmitter 16b each have a line interface and a switch interface as physical terminators. The LT receivers 17a1~17an each have four line interfaces connected to respective ones of four of the 156-Mbps transmission lines, a multiplexer for multiplexing cells output from each of the line interfaces to form 622-Mbps cells, and a switch interface for entering the 622-Mbps cells, which have been read out of the multiplexer, to a cell switch. The LT transmitters 17b1~17bn each have a switch interface for sending the line side 622-Mbps cells switched by a cell switch, a demultiplexer for demultiplexing the 622-Mbps cells to 156 Mbps cells, and line interfaces for mapping the cells from the demultiplexers to the payloads of SONET frames and sending the cells to the line side.

The need for high-speed communication based upon higher functionality and higher speed of terminals is growing and there is a trend toward ever higher transmission rates. In addition, standardization of user interfaces having transmission rates of 1.2 and 2.4 Gbps has begun and there is a good possibility that high-speed transmission lines having these high transmission rates will become more widespread in the future.

When the speed of a transmission line is raised, there is a limitation upon the amount of data that can actually be transferred, or transferred data will be lost, if the basic switching rate of the switch is low. However, raising the speed of the transmission line becomes meaningless if the method employed limits the amount of data transfer, and a deterioration in communication quality due to loss of data will result if the method employed results in lost data.

For these reasons, the prior art is such that the basic switching rate of a cell switch is raised at the same time that the speed of the transmission line is raised so that cells can be switched without loss of cells even when cells having a high transmission rate arrive. However, there are cases where the development of high-speed switches is difficult and takes time. The problem that arises in such cases is that high-speed transmission lines cannot be used until the high-speed switches are developed. Another problem is that an existing low-speed exchange system cannot be extended by connecting high-speed transmission lines to it.

SUMMARY OF THE INVENTION

Accordingly, an object of the present invention is to make it possible for an exchange system to accommodate a high-speed transmission line having a transmission rate higher than the basic switching rate of a cell switch.

Another object of the present invention is to make it possible for a low-speed exchange system to accommodate a high-speed transmission line by changing only the high-speed transmission line accommodating portion without altering the cell switch.

A further object of the present invention is to make it possible for an exchange system to accommodate transmission lines having various transmission rates from a low transmission rate to a transmission rate higher than the basic switching rate.

Still another object of the present invention is to make correct switching possible even when cells conforming to a prescribed call arrive at a speed higher than the basic switching rate of the cell switch.

In accordance with the present invention, the foregoing objects are attained by providing a cell exchange system comprising a plurality of cell switches having a basic switching rate, queuing means provided in correspondence with respective ones of the cell switches for queuing cells from a transmission line, cell demultiplexing means for demultiplexing cells from the transmission line and storing the cells in prescribed queuing means, cell readout means for reading cells out of each of the queuing means at the basic switching rate and entering the cells into the corresponding cell switches, and multiplexing means for multiplexing cells switched by each of the cell switches and sending the cells to a transmission line.

Further, in accordance with the present invention, the foregoing objects are attained by providing a cell exchange system comprising a plurality of cell switches having a basic switching rate, queuing means provided in correspondence with respective ones of the cell switches for queuing cells from a transmission line, a table for storing a corresponding relationship between calls and the queuing means using at least VPI/VCI values set for the calls, cell demultiplexing means for identifying a call by referring to the VPI/VCI values that have been attached to a cell and connecting this cell to the queuing means corresponding to the call identified, cell readout means for reading cells out of each of the queuing means at the basic switching rate in the order in which the cells arrive, and multiplexing means for multiplexing cells switched by each of the cell switches and sending the cells to a transmission lines.

Further, in accordance with the present invention, the foregoing objects are attained by providing a cell exchange system further comprising connected-cell-count monitoring means for monitoring the number of cells that have been connected to each of the queuing means, last-arrival-time storing means for storing, on a per-call basis, last time at which a cell of this call arrived at the cell exchange system, cell interval discriminating means which, when the cell of a prescribed call has arrived, is for obtaining the arrival interval of the cells of this call based upon a difference between the last time and the present time, and determining whether the cell interval is greater than a set time period, and means which, in a case where the cell interval is equal to or less than the set time period, is for connecting the cell to the queuing means that corresponds to the call, and in a case where the cell interval is greater than the set time period, is for obtaining the queuing means for which the count of connected cells is smallest, and connecting the cell to this queuing means.

Further, in accordance with the present invention, the foregoing objects are attained by providing a cell exchange system, which accommodates high-speed transmission lines having a transmission rate higher than a basic switching rate of cell switches, for switching input cells and sending the cells to a prescribed high-speed transmission line, comprising a plurality of cell switches having a basic switching rate, queuing means provided in correspondence with respective ones of the cell switches for queuing cells from a transmission line, means for adding a sequence number, which indicates order of time of arrival, onto an arriving cell on a per-call basis, cell demultiplexing means for connecting a cell onto which the sequence number has been added to queuing means for which the connected cell count is minimum, cell readout means for reading cells out of the queuing means at the basic switching rate and entering the cells into the corresponding cell switch, and means which, when switched cells are multiplexed and transmitted to a transmission line, is for transmitting the cells call by call in the order of the sequence numbers.

Other features and advantages of the present invention will be apparent from the following description taken in conjunction with the accompanying drawings.

BRIEF DESCRIPTION OF THE DRAWINGS

DESCRIPTION OF THE PREFERRED EMBODIMENTS (A) First embodiment (a) Overview of the first embodiment FIG. 1 is a block diagram for describing an overview of a first embodiment of the present invention. Shown in FIG. 1 are high-speed transmission lines 21, 22 that operate at a transmission rate of 1.2 Gbps, cell switches 23a, 23b that operate at a basic switching rate (622 Mbps), and a cell queuing storage unit 24 having FIFO buffers 24a, 24b. The FIFO buffers 24a, 24b are provided in correspondence with the cell switches 23a, 23b, respectively, for queuing cells from the transmission line 21. A cell demultiplexer 25 demultiplexes cells of the 1.2 Gbps transmission rate that arrive from the transmission line 21 and enters the cells into prescribed FIFO buffers 24a, 24b. A cell readout/input unit 26 reads cells out of each of the FIFO buffers 24a, 24b at the basic switching rate of 622 Mbps and inputs the cells to the corresponding cell switches 23a, 23b. A multiplexer 27 multiplexes the 622-Mbps cells switched by the switches 23a, 23b and sends the cells to the transmission line 22 as 1.2 Gbps-cells. A table 28 stores information for deciding to which of the FIFO buffers 24a, 24b a cell is to be written. The information stored in the table 28 is the corresponding relationship between calls and FIFO buffers and is set in the table when a call is established. A call is specified by VPI/VCI values set when a call is established, or by a combination of VPI/VCI values and a tag. A call processor 29 executes processing described later.

Figure 1:
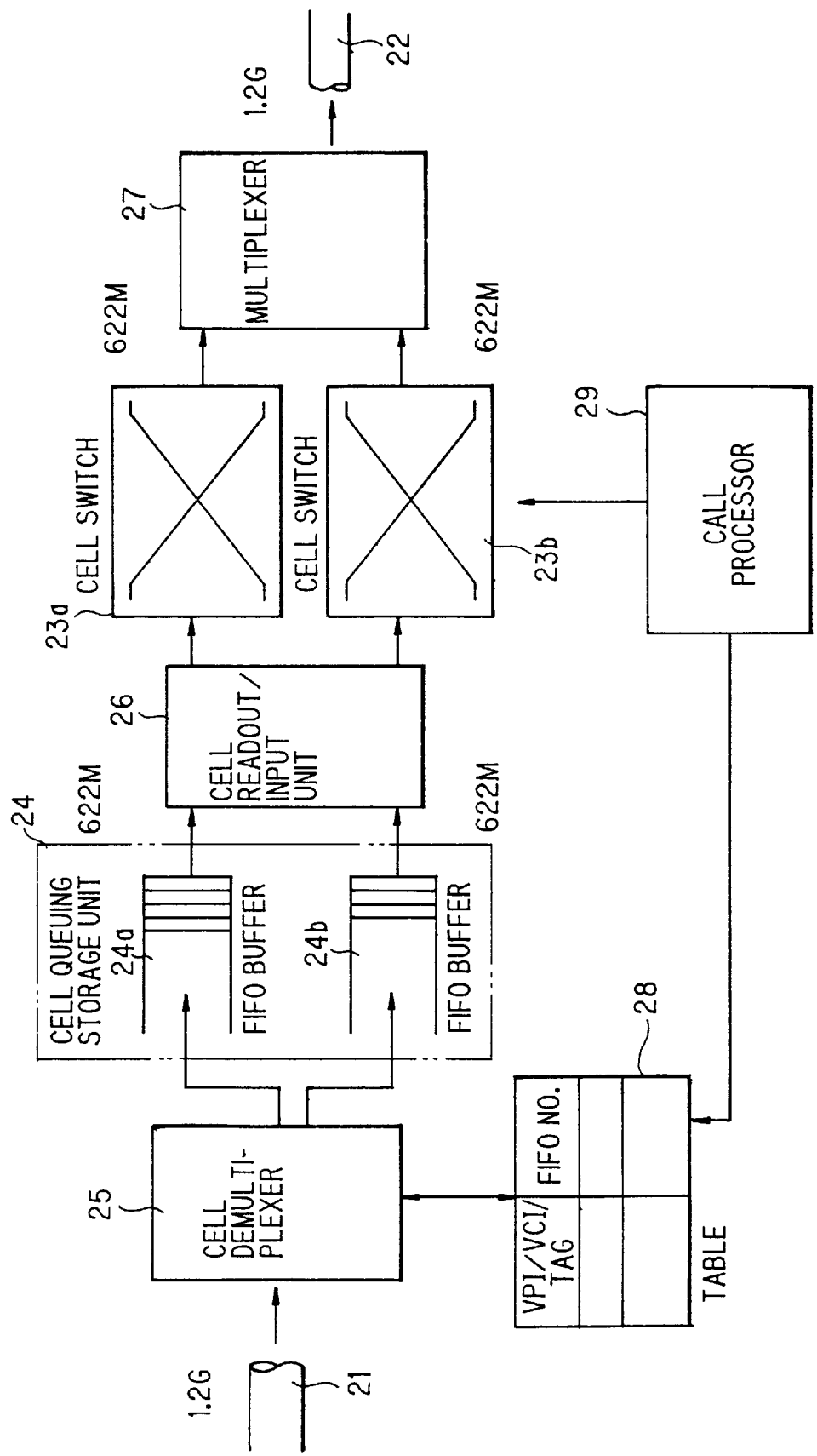
FIG. 1 is a block diagram for describing an overview of a first embodiment of the present invention.

Thus, the two cell switches 23a, 23b operating at the basic switching rate are provided, and the FIFO buffers 24a, 24b are provided to correspond to the cell switches 23a, 23b, respectively, and queue cells from the high-speed transmission line 21.

The cell demultiplexer 25 demultiplexes the 1.2-Gbps cells from the transmission line 21 and stores the cells in the prescribed FIFO buffers 24a, 24b. The cell readout/input unit 26 reads cells out of each of the FIFO buffers 24a, 24b at the basic rate of 622-Mbps and enters the cells into the corresponding cell switches 23a, 23b. Each of the cell switches 23a, 23b switches the entered 622-Mbps cells. The multiplexer 27 multiplexes the 622-Mbps cells switched by each of the cell switches and sends the cells to the transmission line 22 at the rate of 1.2 Gbps.

Cells are allocated to the FIFO buffers 24a, 24b in the following manner:

When call establishment processing is executed, (1) the call processor 29 sets the correspondence between the call and the FIFO number [actually the correspondence between an address (VPI/VCI/tag), which is specified by the VPI/VCI values set for the call and the tag, and the FIFO buffer number] in the table 28. (2) The call processor 29 adds up the band values of the calls correlated with respective ones of the FIFO buffers 24a, 24b. The call processor 29 (3) subtracts the band value from the respective sum in response to end of communication of the call. When a new call has been established, (4) the call processor 29 selects the FIFO buffer for which the sum of the band values is smallest. (5) The call processor 29 sets the call (the address VPI/VCI/tag) in the table 28 so as to correspond to the selected FIFO buffer and updates the sum of the band values. When a cell enters via the high-speed transmission line 21, the cell demultiplexer 25 refers to the VPI/VCI/tag attached to this cell and to the table 28, obtains which of the FIFO buffers 24a, 24b is to have this cell applied thereto, and enters the cell into this FIFO buffer.

Thus, it is so arranged that cells from a high-speed transmission line are demultiplexed to cells having a basic transmission rate, the cells are switched and the switched cells are multiplexed and then sent to a high-speed transmission line. As a result, a high-speed transmission line having a transmission rate higher than the basic switching rate of a cell switch can be accommodated in an exchange system. Further, it is possible for a low-speed exchange system to accommodate a high-speed transmission line by changing only the high-speed transmission line accommodating portion without altering the cell switch. Furthermore, it is possible for an exchange system to accommodate transmission lines having various transmission rates from a low transmission rate to a transmission rate higher than the basic switching rate.

(b) Overall configuration of exchange system

Figure 2:
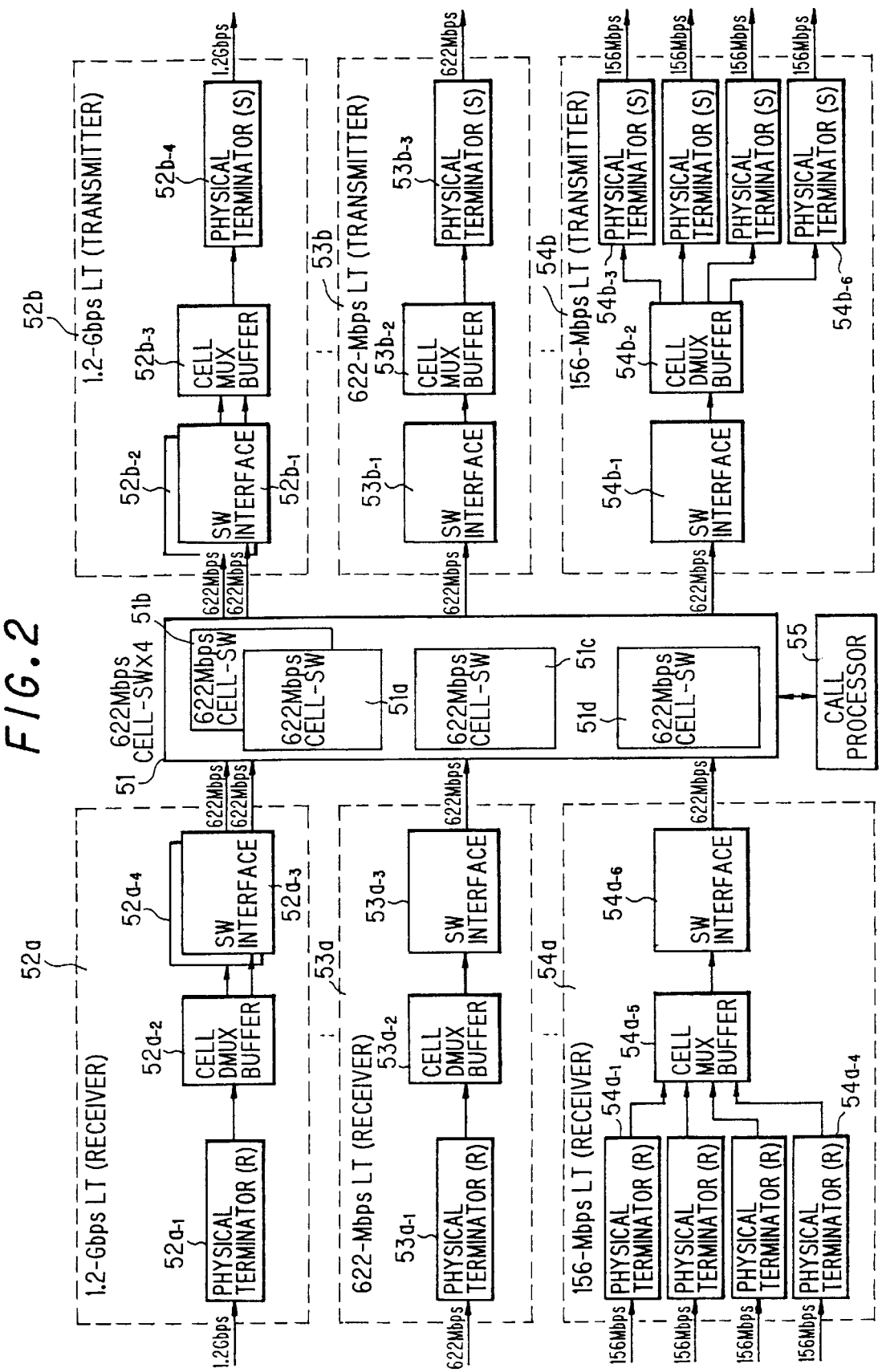
FIG. 2 is a block diagram showing the overall configuration of a cell exchange system according to the present invention.

FIG. 2 is a block diagram showing the overall configuration of a cell exchange system according to the present invention, wherein the exchange system accommodates high-speed transmission lines having various transmission rates. The system is divided into a transmitting section and a receiving section.

Figure 22:
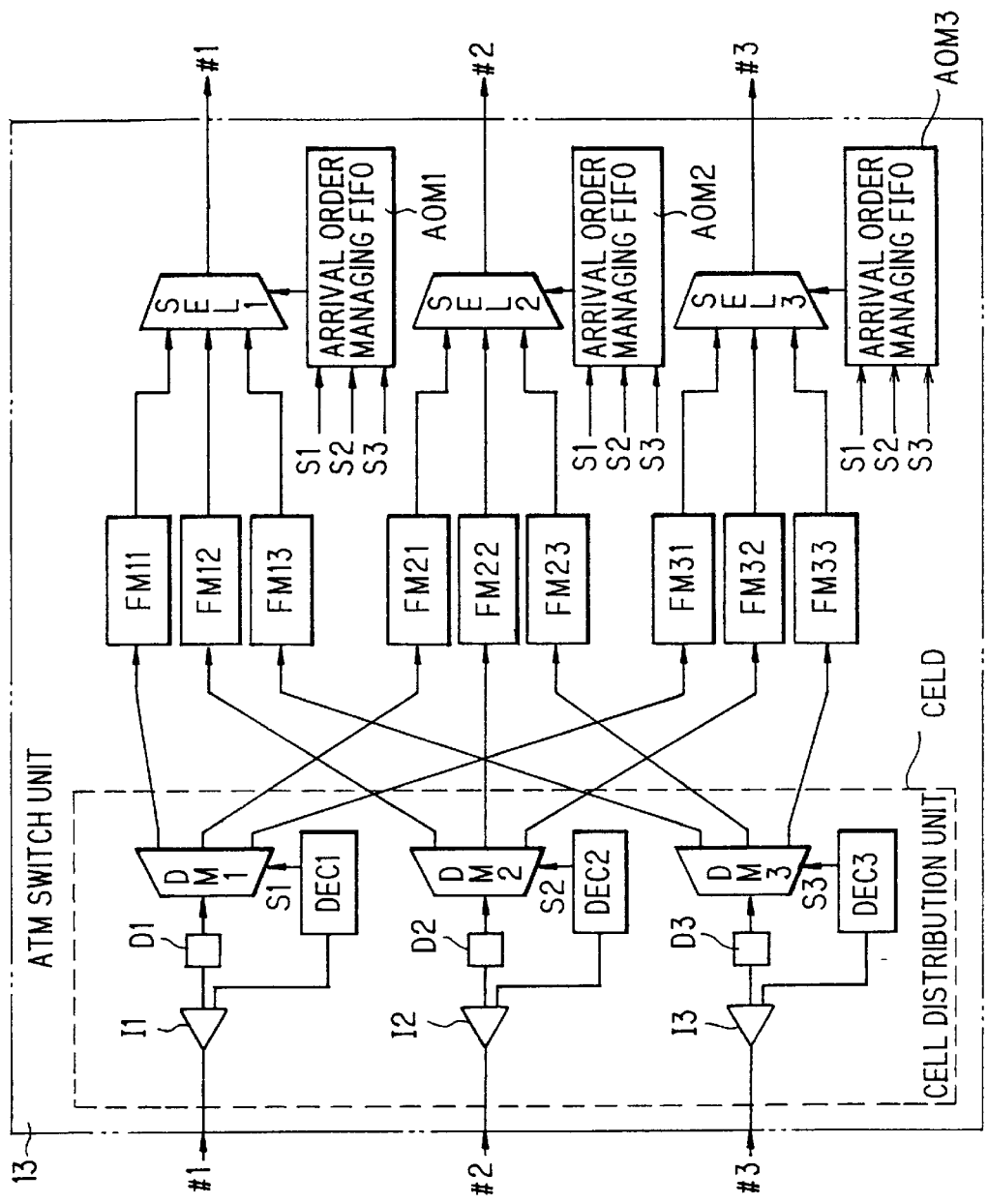
FIG. 22 is a diagram for describing an ATM switch of the self-routing type.
Figure 23:
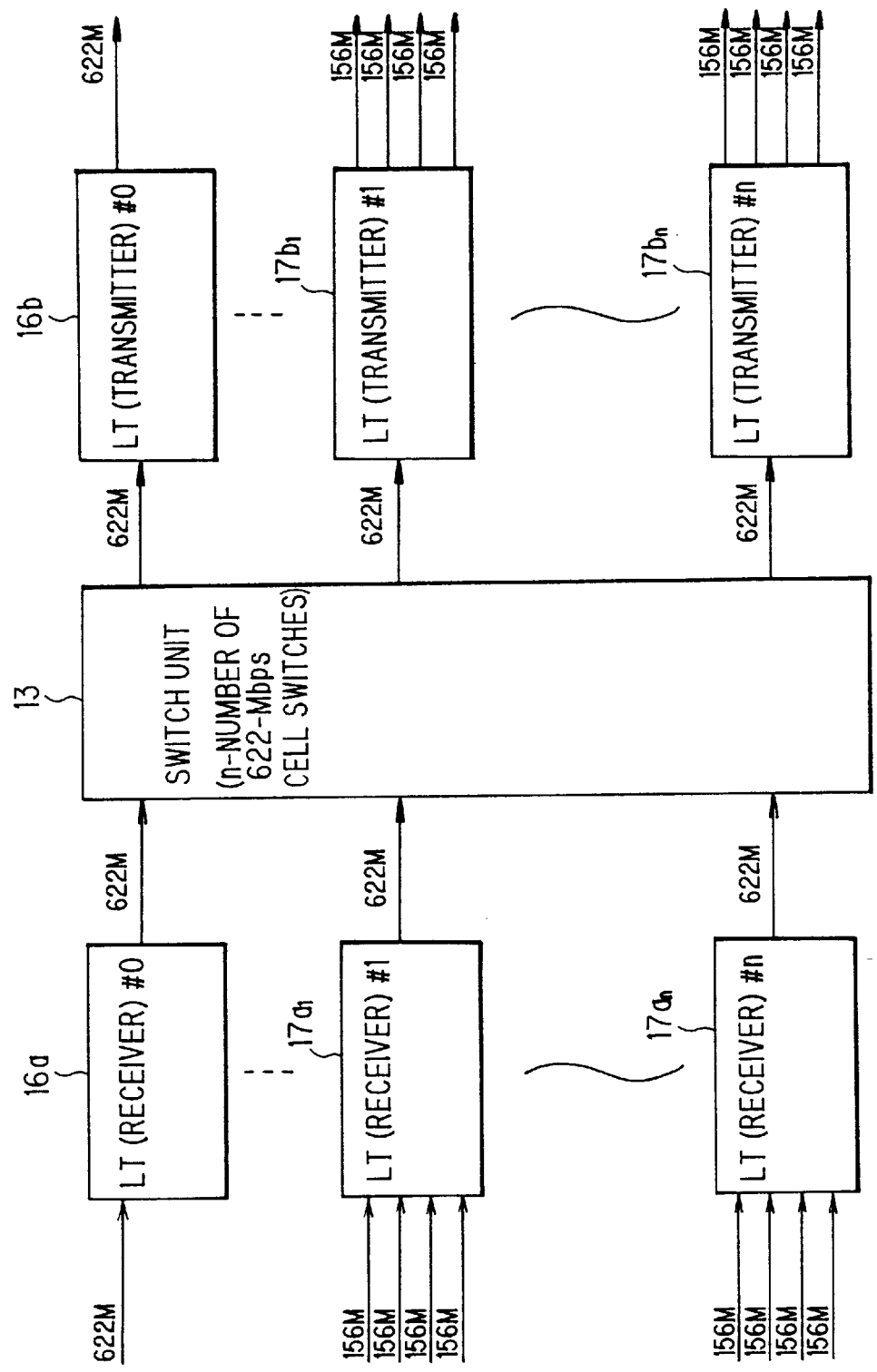
FIG. 23 is a block diagram showing the overall configuration of a cell exchange system.

As shown in FIG. 2, the system includes a cell switch unit 51 having cell switches 51a~51d, which operate at the basic switching rate of 622 Mbps, so that the switching capacity of the switch unit 51 is 4×622 Mbps or 2.4 Gbps. The cell switches 51a~51d are ordinary cell switches (see FIG. 22) of which various types have been proposed, example of which switches of the output buffer type or common buffer type, etc. The system further includes a 1.2-Gbps LT receiver 52a connected to a high-speed transmission line (a 1.2-Gbps transmission line) whose transmission rate is higher than the basic switching rate, a 1.2-Gbps LT transmitter 52b connected to a transmission line whose transmission rate is 1.2 Gbps, a 622-Mbps LT receiver 53a connected to a transmission line whose transmission rate is 622 Mbps, a 622-Mbps LT transmitter 53b connected to a transmission line whose transmission rate is 622 Mbps, a 156-Mbps LT receiver 54a connected to a transmission line whose transmission rate is 156 Mbps, a 156-Mbps LT transmitter 54b connected to a transmission line whose transmission rate is 156 Mbps, and a call processor 55. The LT transmitters and LT receivers can be of various types (1.2-Gbps LTs, 622-Mbps LTs, 156-Mbps LTs) depending upon differences in the connected transmission lines and terminal speeds. The arrangement is such that the circuitry on the left side of the switch unit 51 is the receiving section and the circuitry on the right side the transmitting section.

The LT receiver 52a has a physical terminator 52a-1 for terminating the physical interface, extracting a cell from the payload of e.g. a SONET frame and sending the cell to the next stage, a cell demultiplexing/queuing unit (CELL-DMUX) 52a-2 for demultiplexing the entered 1.2-Gbps cells to 622-Mbps cells and queuing the cells, and switch interfaces 52a-3, 52a-4 for entering the demultiplexed cells into the corresponding cell switches 51a, 51b. The LT transmitter 52b has switch interfaces 52b-1, 52b-2 for sending the line side cells of the basic switching rate (622 Mbps) switched by the cell switches 51a, 51b, a cell multiplexer (CELL-MUX) 23b-3 for multiplexing the cells of the basic switching rate, which have entered from the switch interfaces 52b-1, 52b-2, to cells having the transmission rate of 1.2 Gbps, and a physical terminator 52b-4 for mapping the 1.2-Gbps cells to the payload of a SONET frame and sending the cells to the line side.

The LT receiver 53a has a physical terminator 53a-1, a cell demultiplexer (CELL-DEMUX) 53a-2 and a switch interface 53a-3. The LT transmitter 53b has a switch interface 53b-1, a cell multiplexer (CELL-MUX) 53b-3 and a physical terminator 53b-3.

The LT receiver 54 has four physical terminators 54a-1~54a-4 connected to respective ones of four 156-Mbps transmission lines, a cell multiplexer (CELL-MUX) 54a-5 for multiplexing cells output from each of the physical terminators to 622-Mbps cells, and a switch interface 54a-6 for entering the 622-Mbps cells, which have been read out of the cell multiplexer, into the cell switch 51d. The LT transmitter 54b has a switch interface 54b-1 for sending the line side the 622-Mbps cells switched by the cell switch 51d, a cell demultiplexer (CELL-DMUX) 54b-2 for demultiplexing the 622-Mbps cells to 156-Mbps cells, and physical terminators 54b-3~54b-6 for mapping the 156-Mbps cells from the cell demultiplexer to the payload of a SONET frame and sending the cells to the line side.

The LT receiver 52a and LT transmitter 52b for accommodating the transmission lines having the transmission rate of 1.2 Gbps, which is higher than the basic switching rate of 622 Mbps, will now be described.

(c) Cell demultiplexing/queuing unit (CELL-DMUX)

(c-1) Construction

Figure 3:
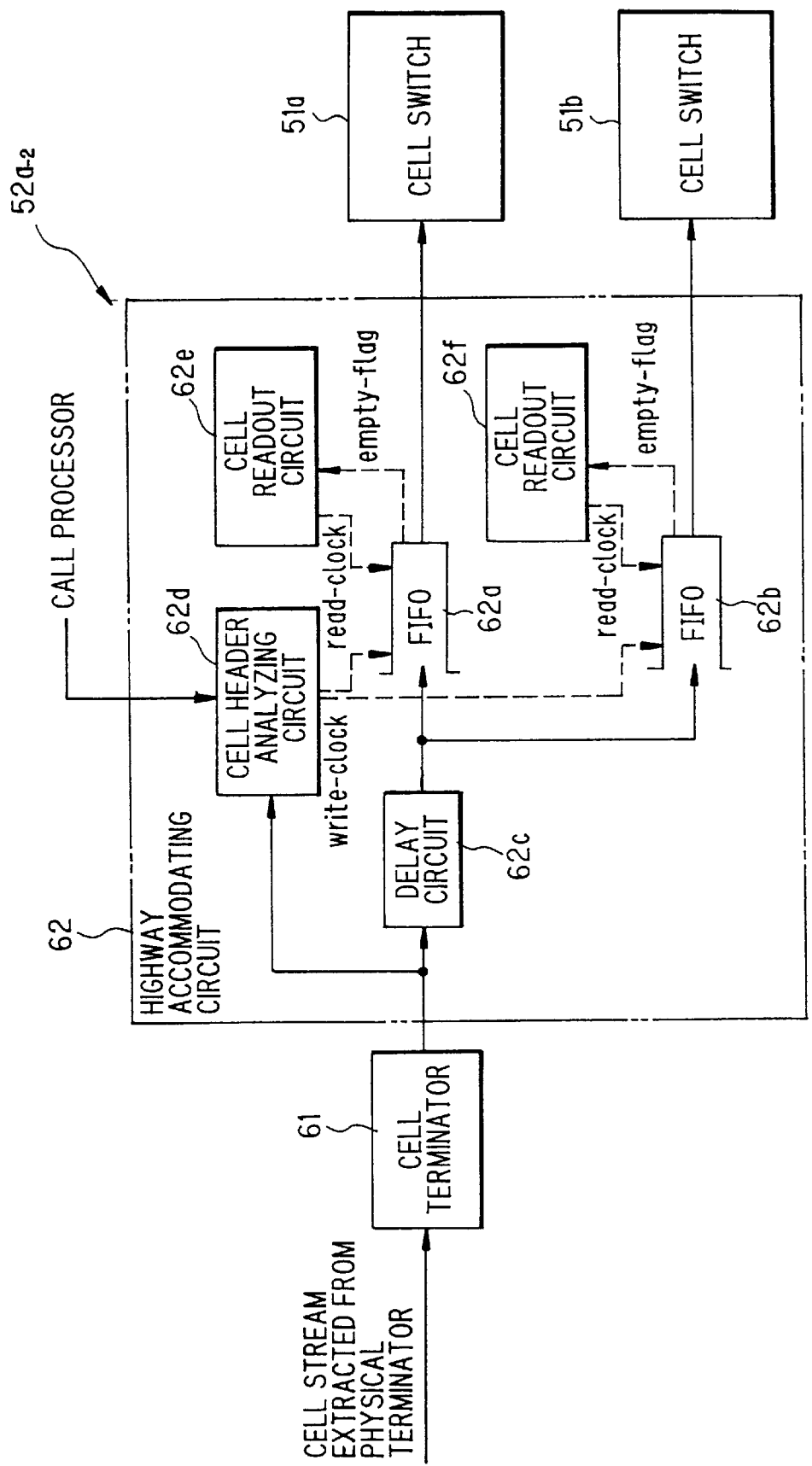
FIG. 3 is a block diagram showing the construction of a cell demultiplexing/queuing unit.

FIG. 3 is a block diagram showing the construction of the cell demultiplexing/queuing unit 52a-2. As shown in FIG. 3, the unit 52a-2 includes a cell terminating circuit 61 for verifying the normality of cells, and a highway accommodating circuit 62 for separating the cell rate from the transmission line into the basic switching rates of the cell switches 51a, 51b.

The transmission rate of the high-speed transmission line is 1.2 Gbps, and the basic switching rate is 622 Mbps. For this reason, the two cell switches 51a, 51b are provided in correspondence with the high-speed transmission line. The highway accommodating circuit 62 has two FIFO buffers 62a, 62b, which are provided so as to correspond to the cell switches 51a, 51b, for queuing the multiplexed cells, a delay circuit 62c for delaying, for a prescribed period of time, the cells output from the cell terminator 61, a cell header analyzing circuit 62d for analyzing cell headers, separating the cells and writing the cells to the FIFO buffers 62a, 62b, and cell readout circuits 62e, 62f for reading cells out of the FIFO buffers 62a, 62b at the basic switching rate and entering the cells into the corresponding cell switches.

A prescribed period of time is necessary for the cell header analyzing circuit 62d to decide to which of the FIFO buffers a cell should be written. The delay circuit 62c, therefore, delays the cells for this period of time. Upon deciding the FIFO buffer to which the cell will be written, the delay circuit 62c enters a 1.2-GHz write clock write-clock into this FIFO buffer. The FIFO buffers 62a, 62b each enter an empty signal empty-flag, which indicates whether the FIFO buffer has stored a cell, to the corresponding cell readout circuits 62e, 62f. If cells have been stored, the cell readout circuits 62e, 62f generate readout clocks read-clock having the basic switching rate of 622 Mbps, so that cells are read out of the FIFO buffers and entered into the cell switches 51a, 51b in sync with the clock.

(c-2) Cell header analyzing circuit

Figure 4:
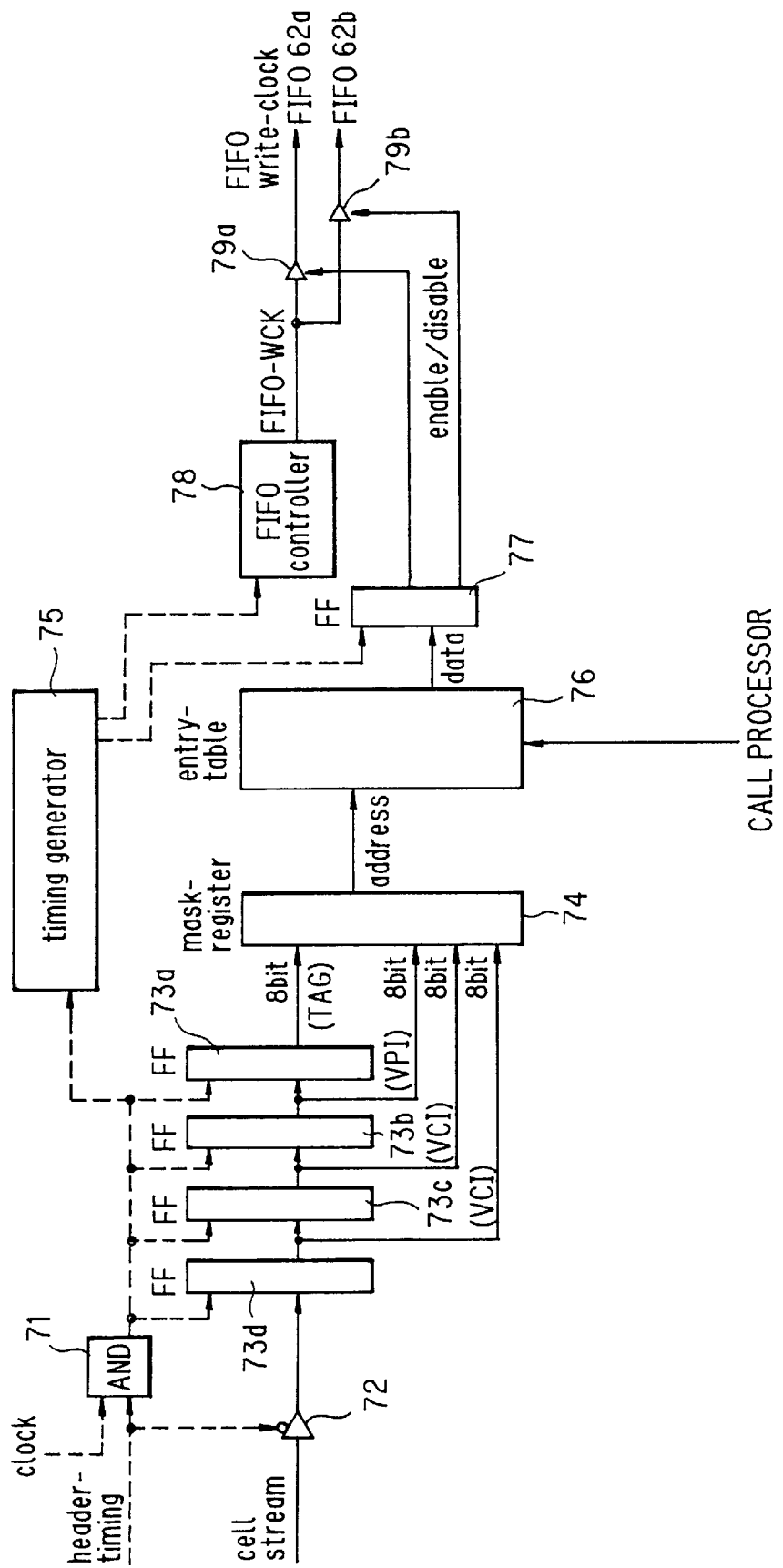
FIG. 4 is a diagram illustrating a cell header analyzing circuit.

FIG. 4 is a diagram illustrating the construction of the cell header analyzing circuit 62d. The circuit includes an AND gate 71 for passing the clock for the duration of a cell header, a gate 72 for passing the cell header, registers 73a~73d for holding the tag and the VPI/VCI values that have been added onto the cell header, a mask register 74 for selecting and outputting a prescribed VPI/VCI/tag as an address, a timing generator 75, an entry table 76 for storing information that decides into which of the FIFO buffers 62a, 62b a cell is to be entered, an output register 77 for storing the above-mentioned information, which is specified by an address, and outputting an enable/disable signal, a FIFO controller 78 for generating the write clock of the FIFO buffers, and gate circuits 79a, 79b for outputting the write clock to the FIFO buffers 62a, 62b at input of the enable signal.

Figure 5:
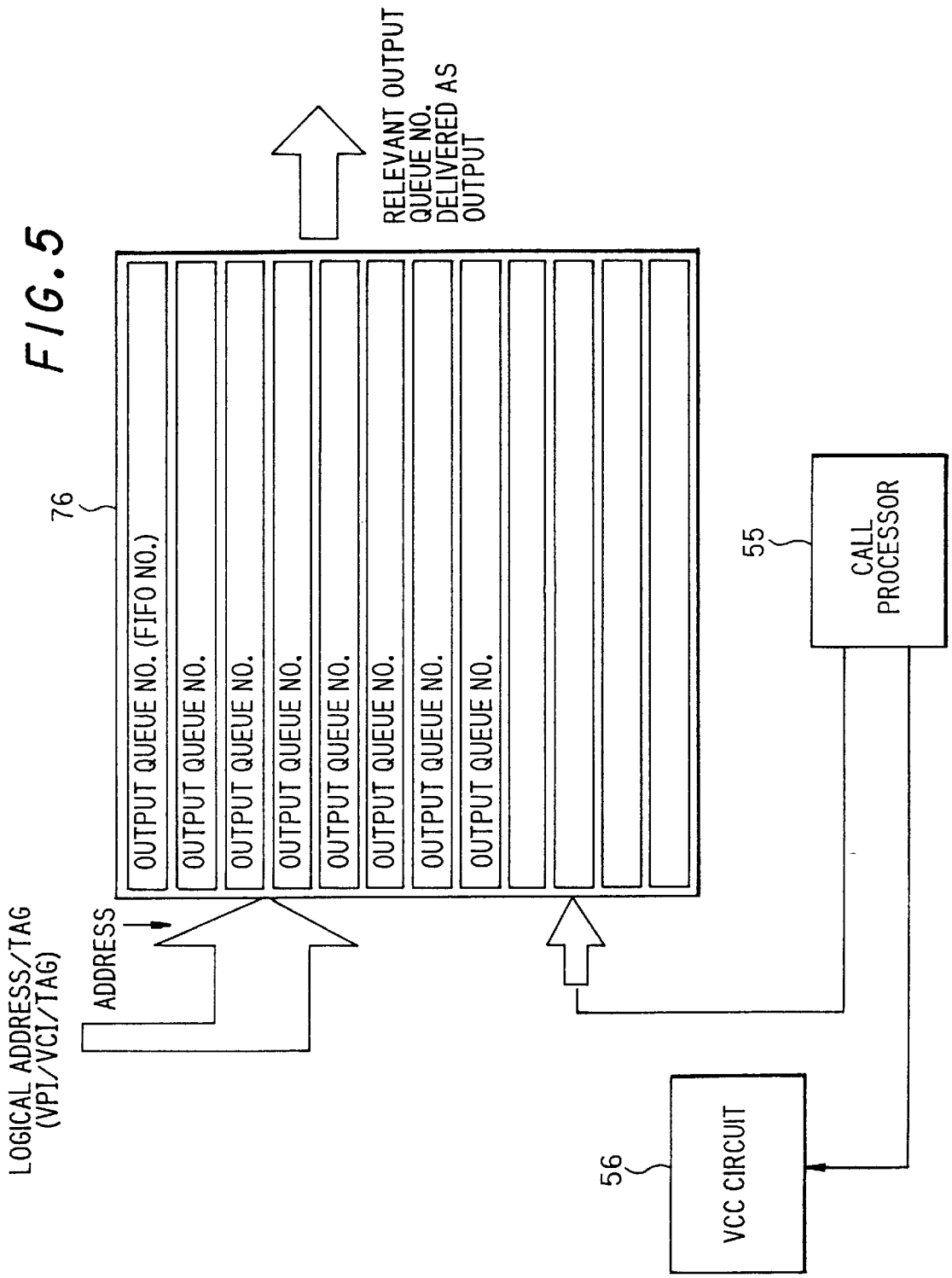
FIG. 5 is a diagram for describing an entry table.

As shown in FIG. 5, the entry table 76 has combinations of VPI/VCI values and tags as addresses and stores, at each address, an output queue number (FIFO number) for designating the FIFO buffer to which a cell is to be applied. Since a VPI/VCI/tag uniquely specifies a call, the FIFO numbers stored in the entry table 76 correspond to calls.

(c-3) FIFO decision processing for queuing cells

The content at each address of the entry table 76 is rewritten under the control of the call processor 55.

Figure 6:
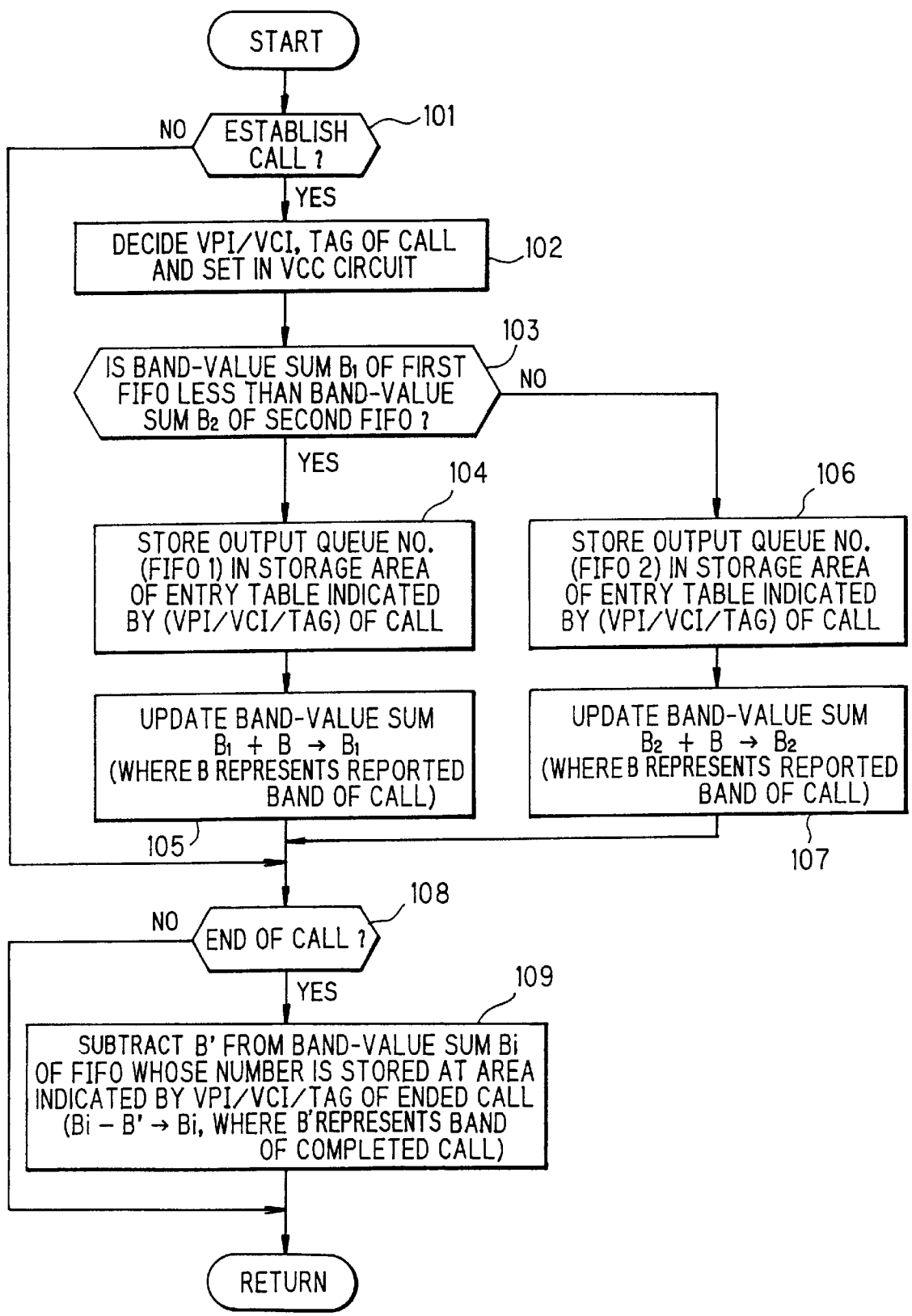
FIG. 6 is a flowchart of processing for deciding a FIFO buffer which is to queue cells.

FIG. 6 is a flowchart of processing executed by the call processor 55 to decide the cell queuing FIFO. The call processor 55 determines whether call establishment processing is required (step 101). If such processing is required, the call processor 55 executes call establishment processing to decide the VPI/VCI values and the tag of the call and sets these in a VC conversion table of a VCC circuit 56 (FIG. 5) (step 102). As a result, the VCC circuit 56 is capable of adding the tag onto the cell that has entered from the transmission line and of replacing the VPI/VCI.

Next, the call processor compares the magnitudes of the band-value sum B1 of the first FIFO buffer 62a (FIG. 3) and the band-value sum B2 of the second FIFO buffer 62b and determines whether B1<B2 holds (step 103). The meaning of the band-value sum is as follows: Whenever a call is correlated with a FIFO buffer, band values reported by the relevant terminals with regard to the call are added up. In response to end of communication of a call, a band value is subtracted from the sum. The value obtained is the band-value sum.

If B1<B2 holds, the call processor writes the FIFO number of the FIFO buffer 62a in the storage area of the entry table 76 indicated by the VPI/VCI values and tag of the call (step 104) and updates the band-value sum B1 by the operation B1+B→B1 (step 105), where the initial value of B1 is zero and B is the band value reported by the terminal in regard to the call and is assumed to be smaller than the basic switching rate. If B1>B2 holds, on the other hand the call processor writes the FIFO number of the FIFO buffer 62b in the storage area of the entry table 76 indicated by the VPI/VCI values and tag of the call (step 106) and updates the band-value sum B2 by the operation B2+B→B2 (step 107), where the initial value of B2 is zero.

If it is decided that call establishment processing is not required at step 101, the call processor determines whether a call currently in progress has ended (step 108). If the call has not ended, the program returns to the beginning and processing is repeated. If the call in progress has ended, the call processor subtracts B' from the band-value sum Bi of the FIFO buffer indicated by the FIFO number that has been stored in the storage area of the entry table 76 indicated by the VPI/VCI/tag of the ended call (Bi−B'→Bi; step 109), the program returns to the beginning and the call processor repeats the above-described processing. It should be noted that B' represents the reported band of the call that has ended.

As a result of the foregoing processing, the FIFO buffer to which a cell is to be applied is decided upon being made to correspond to the call, i.e. to VPI/VCI/tag.

(c-4) Operation of cell demultiplexer/queuing unit

The VPI/VCI values and the tag decided at the time of call establishment are added onto the header of the cell output from the cell terminator 61 (FIG. 3). Accordingly, the cell header analyzing circuit 62d obtains the FIFO buffer to which a cell is to be applied by referring to the entry table 76 using the VPI/VCI values and the tag as the address and enters the write clock into this FIFO buffer. The FIFO buffer to which the write clock has been applied writes in the cell that has been delayed by the delay circuit 62c and subsequently performs similar writing control. In concurrence with the writing operation described above, the cell readout circuits 62e, 62f read out the cells, which have been stored in the FIFO buffers 62a, 62b, at the basic switching rate and enter the cells into the cell switches 51a, 51b, respectively. As a result, the cell switches 51a, 51b switch the input cells based upon the tags and output the cells to the prescribed paths.

(d) Cell multiplexer (CELL-MUX)

Figure 7:
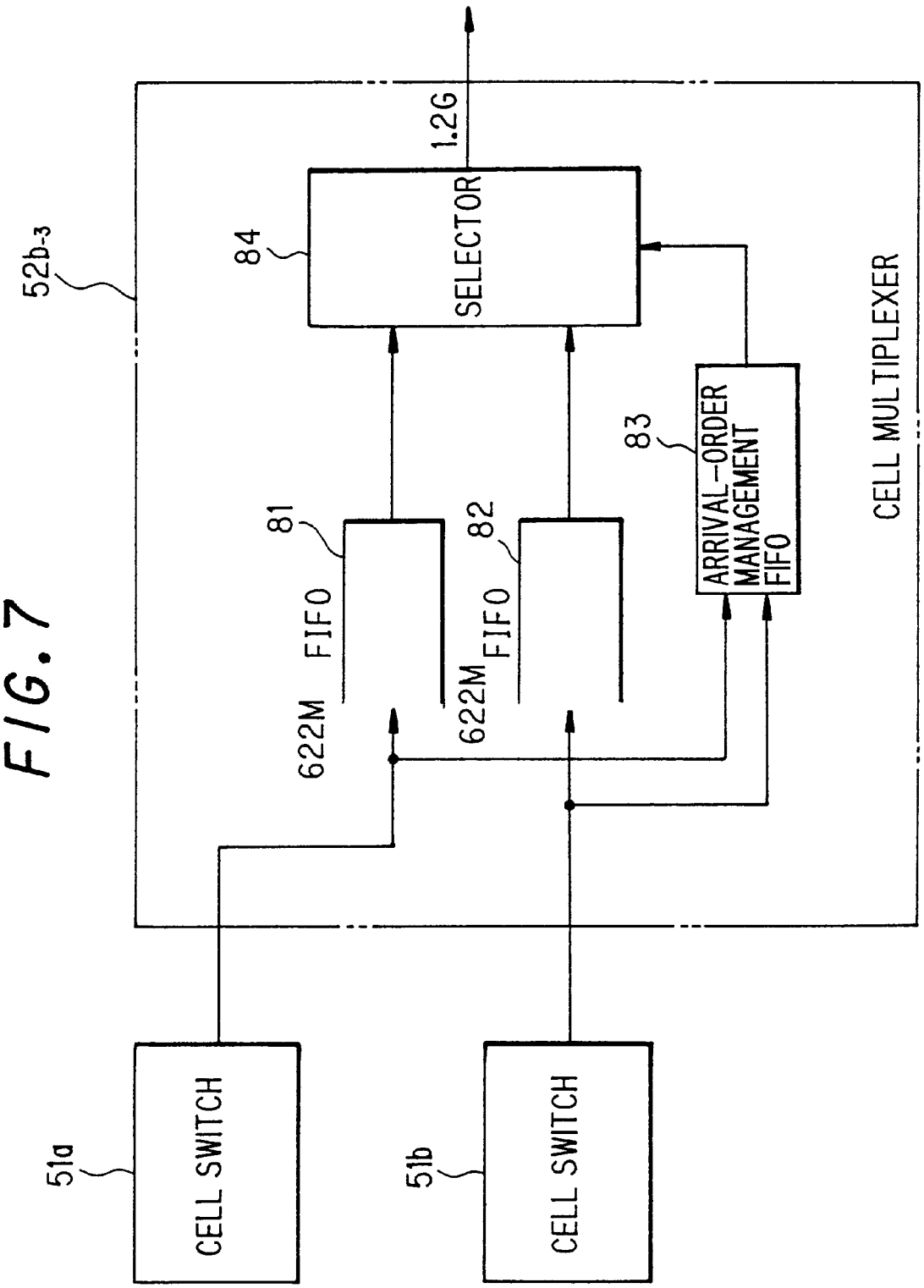
FIG. 7 is a block diagram showing the construction of a cell multiplexer.

FIG. 7 is a block diagram showing the construction of the cell multiplexer 52b-3 (FIG. 2). The cell multiplexer 52b-3 includes a first FIFO buffer 81 for writing in cells of the basic switching rate (622 Mbps) output from the first cell switch 51a, a second FIFO buffer 82 for writing in cells of the basic switching rate (622 Mbps) output from the second cell switch 51b, a cell-arrival order management FIFO 83 for storing the FIFO numbers of the FIFO buffers, to which cells have been written, in the order in which the cells were written to the first and second FIFO buffers, and a selector 84 which, in accordance with the cell arrival order, reads cells out of the first and second FIFO buffers 81, 82 at the transmission rate of 1.2 Gbps and enters the cells into the physical terminator 52b-4.

In accordance with the cell multiplexer 52b-3, two cell streams of the basic switching rate that arrive from the cell switches 51a, 51b can be multiplexed and the cell streams can be sent to the high-speed transmission line via the physical terminator 52b-4 in the order of cell arrival.

As a result of the foregoing operation, it is so arranged that cells from the high-speed transmission line are entered into the cell switches 51a, 51b upon being demultiplexed to cells having the basic switching rate by the cell demultiplexing/queuing unit 52a-2, and the cells switched by the cell switches 51a, 51b are sent to the high-speed transmission line upon being multiplexed by the cell multiplexer 52b-3. This makes it possible for an exchange system to accommodate a high-speed transmission line having a transmission rate higher than the basic switching rate of a cell switch. Further, it is so arranged that the cell demultiplexing/queuing unit 52a-2 allocates cells to each of the FIFO buffers based upon a sum of band values. As a result, cells are demultiplexed in such a manner that loss of cells does not take place, after which the cells are switched and multiplexed so that they can be sent to a high-speed transmission line.

(B) Second embodiment (a) Overview of the second embodiment

In the first embodiment, loss of cells will occur if cells conforming to a prescribed call arrive at a rate higher than the basic switching rate (622 Mbps) of the cell switch. The second embodiment is so adapted that cells will not be lost even in case of the abovementioned scenario.

Figure 8:
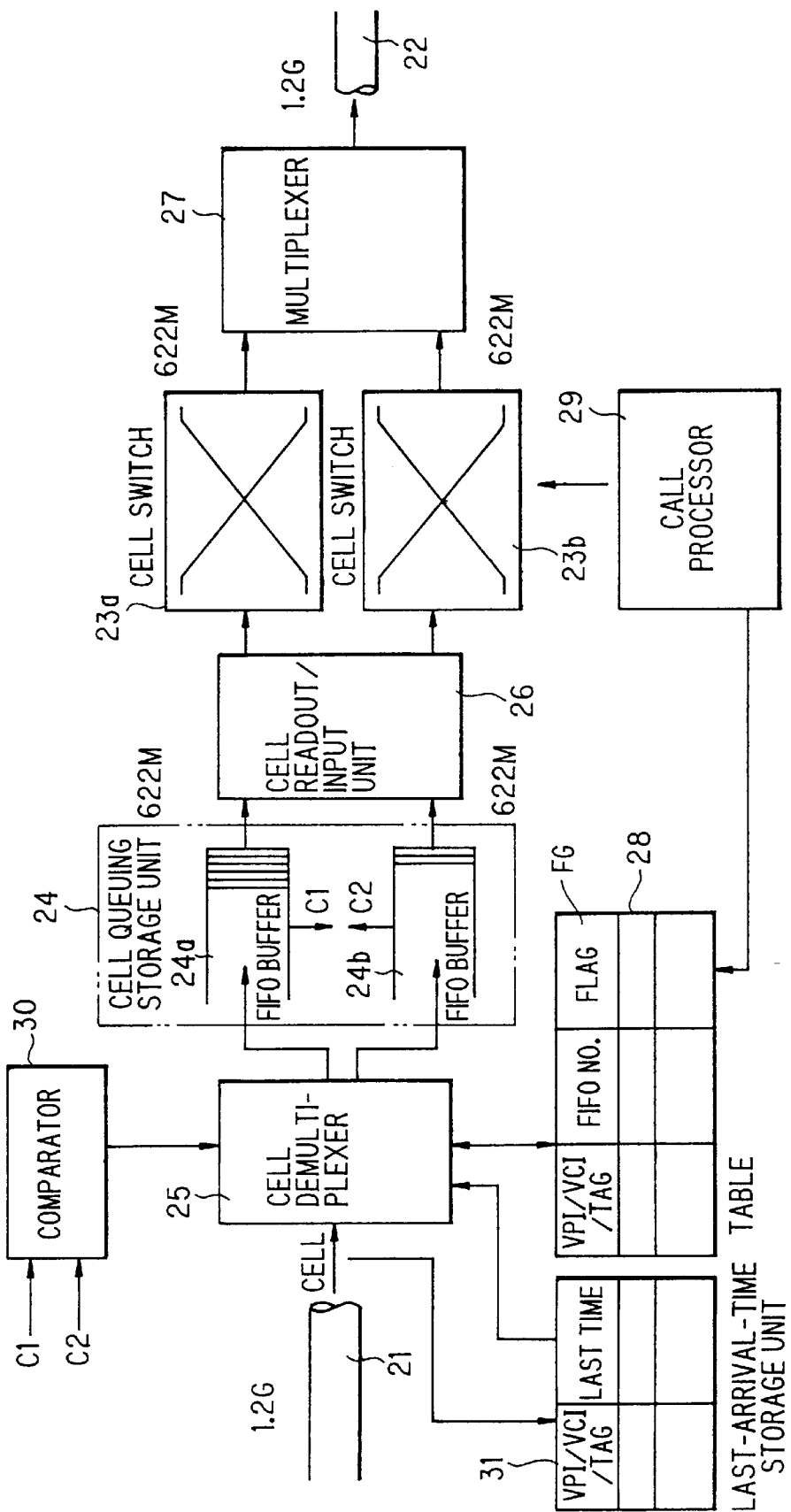
FIG. 8 is a diagram for describing an overview of a second embodiment of the present invention.

FIG. 8 is a block diagram for describing an overview of the second embodiment of the present invention. Elements in FIG. 8 identical with those shown in FIG. 1 are designated by like reference characters. The arrangement of the second embodiment includes a comparator 30 for comparing the magnitudes of cell counts C1, C2 representing the numbers of cells residing in the FIFO buffers 24a, 24b, respectively, and a last-arrival-time storage unit 31 for storing, on a per-call basis, the last time at which the cell of each call arrived at the cell exchange system. The storage unit 31 stores the correspondence between addresses (VPI/VCI/tab), which are combinations of VPI/VCI values and tags set for the calls, and last arrival times.

The table 28 stores a flag FG, which indicates a cell allocation standard, in addition to the correspondence between the VPI/VCI/tags of calls and FIFO numbers. More specifically, in a manner similar to that of FIG. 1, the call processor 29 correlates a call (VPI/VCI/tag) with either of the FIFO buffers at establishment of a call. In addition, the call processor 29 sets the flag FG, which indicates the cell allocation standard, in the table 28. For example, the call processor 29 sets the flag FG to "0" with regard to a call having a CBR (constant bit rate) lower than the basic switching rate, and to "1" with regard to a call having a VBR (variable bit rate), which possibly may exceed the basic switching rate, or a bursty call.

With FIFO numbers and flags having been set in the table 28 in correspondence with calls, the comparator 30 compares the magnitudes of cell counts C1, C2 residing in the FIFO buffers 24a, 24b, and the last-arrival-time storage unit 31 stores, on a per-call basis, the last time at which the cell of the call arrived at the cell exchange system. The cell demultiplexer 25 demultiplexes the cell stream that arrives from the transmission line 21 to cells, refers to the VPI/VCI/tag of the cell to obtain the flag FG from the table 28, and determines whether the flag is "0" or "1".

When the flag FG is "0", the cell demultiplexer 25 inputs the cell to the FIFO buffer designated by the table 28. When the flag FG is "1", the cell demultiplexer 25 obtains the last arrival time from the last-arrival-time storage unit 31 upon referring to the VPI/VCI/tag that has been attached to this cell, and obtains the cell interval of the call, to which the cell belongs, based upon the difference between the last arrival time and the present time.

Next, the cell demultiplexer 25 compares this cell interval with a set time period and, if the cell interval is greater than the set time period, writes (connects) the cell to the FIFO buffer for which the residing number of cells is smaller. If the cell interval is equal to or less than the set time period, the cell demultiplexer 25 refers to the table 28 and writes the cell to the FIFO buffer indicated by the table.

Thus, it is so arranged that the cell is stored in the FIFO buffer whose resident cell count is smaller. As a result, cells can be allocated in such a manner that cells will not overflow from the FIFO buffers 24a, 24b (i.e., in such a manner that cells will not be lost). If cells are entered indiscriminately into the FIFO buffer having the smaller resident cell count in this case, a phenomenon occurs wherein the order in which cells arrive from the transmission line 21 and the cell-output order in which cells are sent to the transmission line 22 are reversed. Accordingly, the cell interval is monitored call by call and a cell is entered into the FIFO buffer having the smaller resident cell count only in case of a cell whose cell interval is greater than the set time period. In case of a cell having a short cell interval, the cell is entered into the FIFO buffer that has been set in the table. Accordingly, assume that the cell interval of a certain call is greater than the set time period. When a latter cell of this call arrives at the exchange system, an earlier cell of the call will already have been switched, multiplexed and output; hence, the reversal phenomenon will not occur. In other words, the above-mentioned set time period is the minimum time period which assures that the reversal will not occur.

(b) Cell demultiplexing/queuing unit (b-1) Construction

Figure 9:
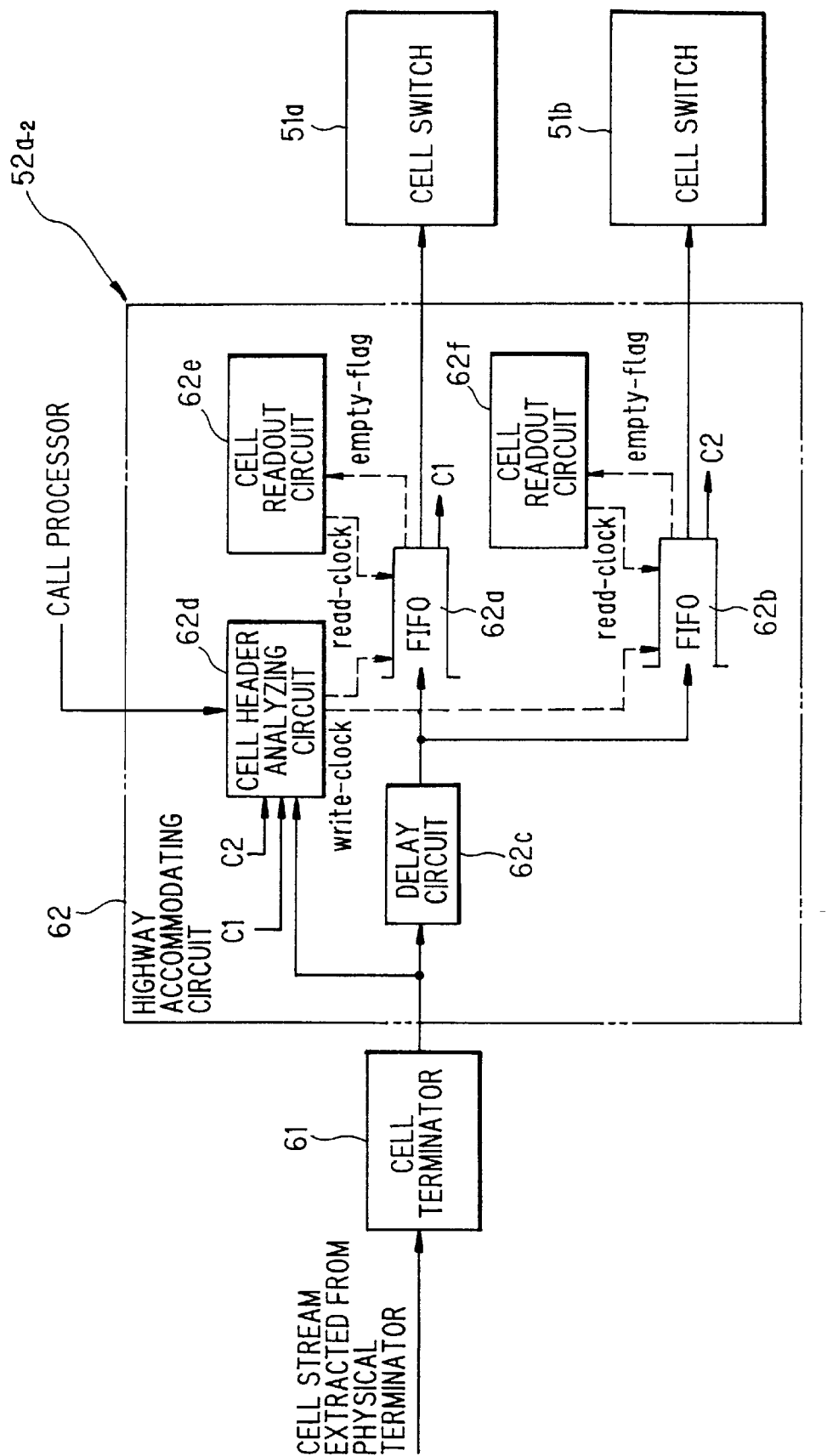
FIG. 9 is a diagram showing the construction of a cell demultiplexing/queuing unit according to the second embodiment.

FIG. 9 is a block diagram showing the construction of the cell demultiplexing/queuing unit 52a-2 according to the second embodiment. Elements identical with those of the first embodiment are designated by like reference characters. The cell demultiplexing/queuing unit of this embodiment differs from that (FIG. 3) of the first embodiment in that the numbers C1, C2 of cells that reside in the FIFO buffers 62a, 62b enter the cell header analyzing circuit 62d, and in the construction of the cell header analyzing circuit 62d.

(b-2) Cell header analyzing circuit

Figure 10:
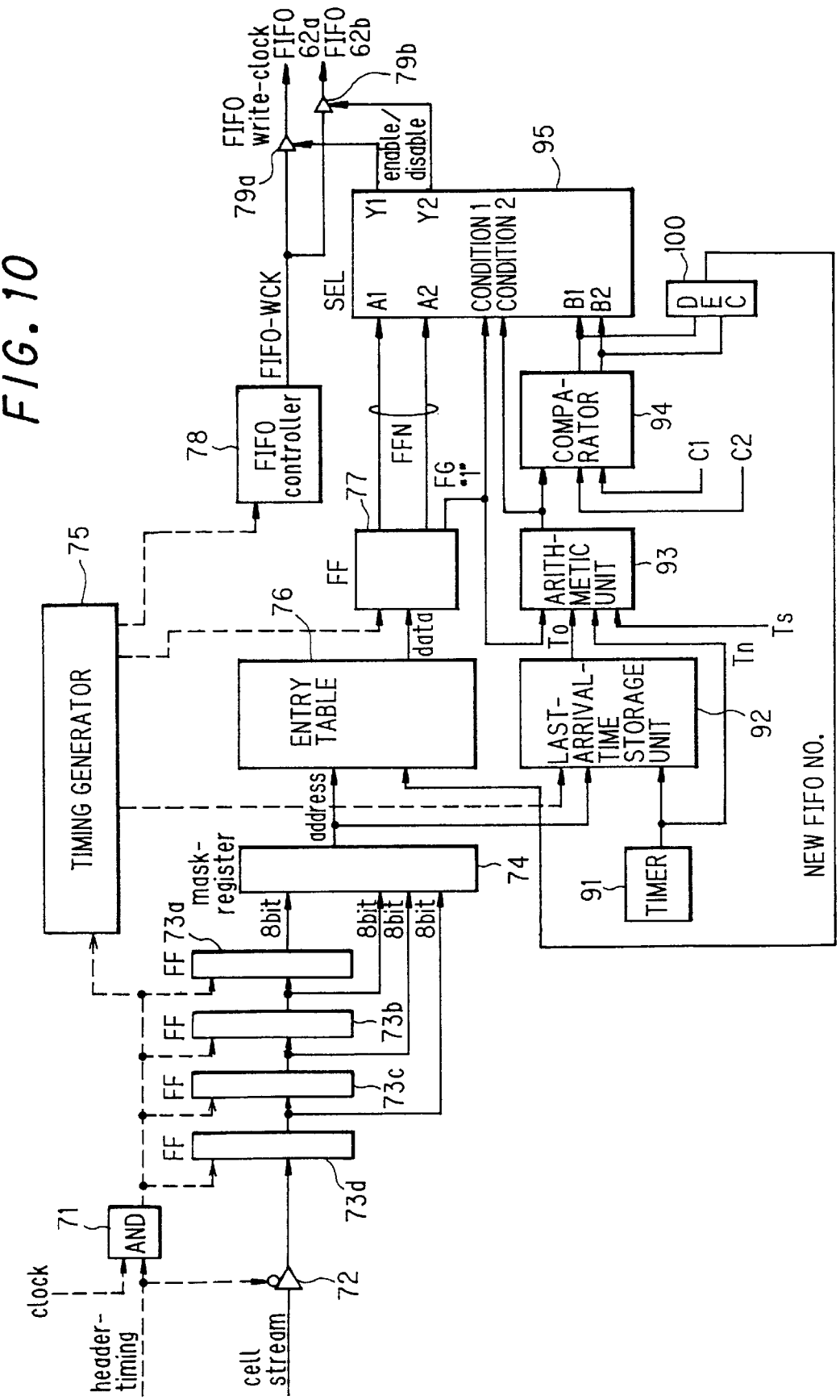
FIG. 10 is a diagram illustrating the construction of a cell header analyzing circuit according to the second embodiment.

FIG. 10 is a diagram illustrating the construction of the cell header analyzing circuit 62d. The circuit includes the AND gate 71 for passing the clock for the duration of a cell header, the gate 72 for passing the cell header, the registers 73a~73d for holding the tag and the VPI/VCI values that have been added onto the cell header, the mask register 74 for selecting and outputting a prescribed VPI/VCI/tag as an address, the timing generator 75, and the entry table 76 which, on a per-call (VPI/VCI/tag) basis, stores (1) information that decides into which of the FIFO buffers 62a, 62b a cell is to be entered, and (2) the flag FG indicating the cell allocation standard. The cell header analyzing circuit 62d further includes the output register 77 for storing the information read out of the entry table, the FIFO controller 78 for generating the write clock of the FIFO buffers, and the gate circuits 79a, 79b for outputting the write clock to the FIFO buffers 62a, 62b at input of the enable signal.

The cell header analyzing circuit 62d further includes a timer 91, a last-arrival-time storage unit 92 for storing, on a per-call (VPI/VCI/tag) basis, the last cell arrival time $T_0$ of a call, and an arithmetic unit 93 which, when the cell of a certain call has arrived, calculates the cell interval $T (=T_n - T_0)$ of the call based upon the difference between the last cell arrival time To and the present time Tn and compares the magnitudes of the cell interval T and a set time period Ts. The cell header analyzing circuit 62d further includes a comparator 94 for comparing the magnitudes of the resident cell counts C1, C2 of the FIFO buffers 62a, 62b, and a selector 95 which decides into which of the FIFO buffers 62a, 62b a cell is to be entered based upon the "1", "0" logic of the flag FG indicating the cell allocation standard and the magnitudes of the cell interval T and set time period Ts.

Figure 11:
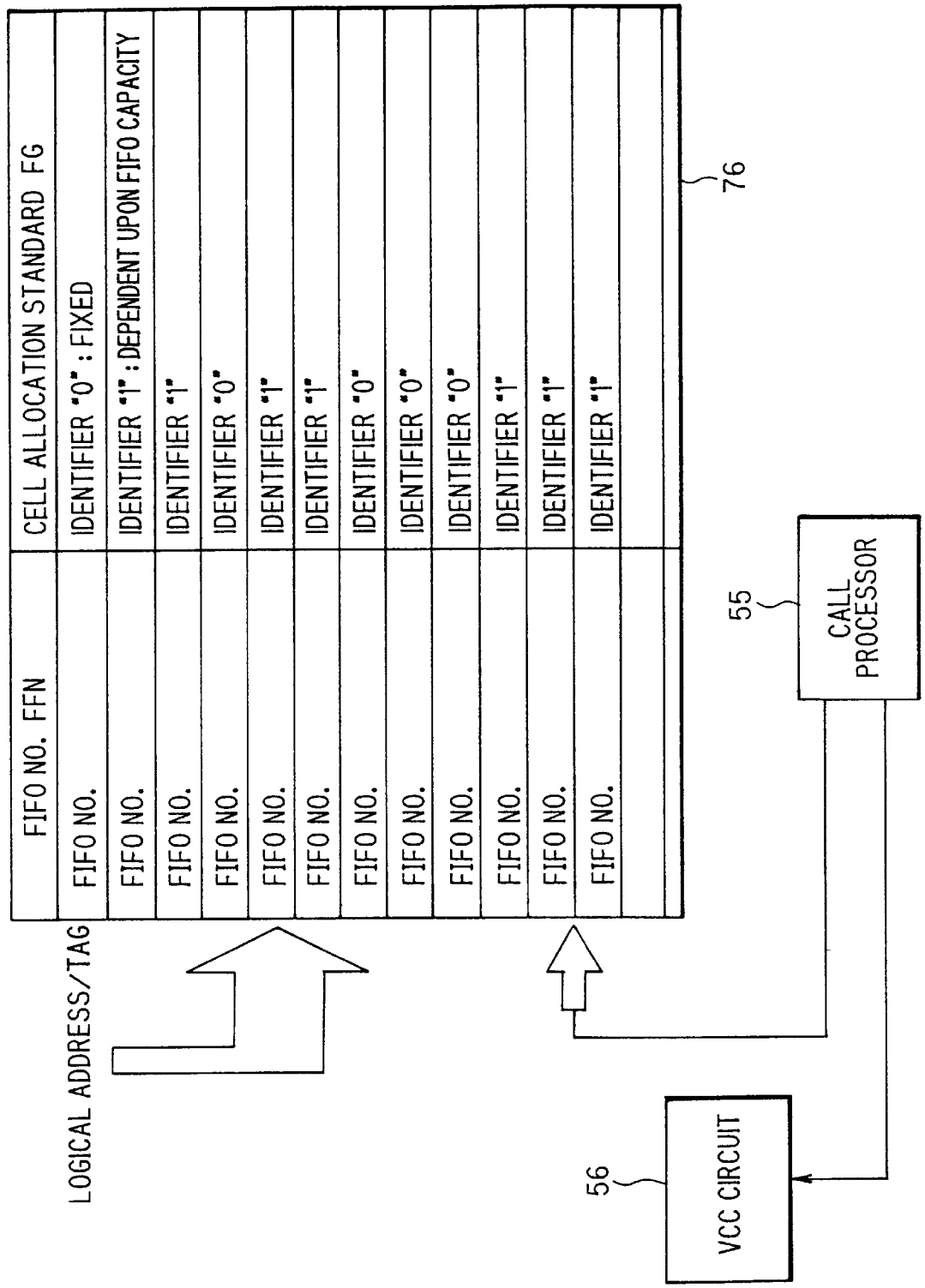
FIG. 11 is a diagram for describing an entry table according to the second embodiment.
Figure 12:
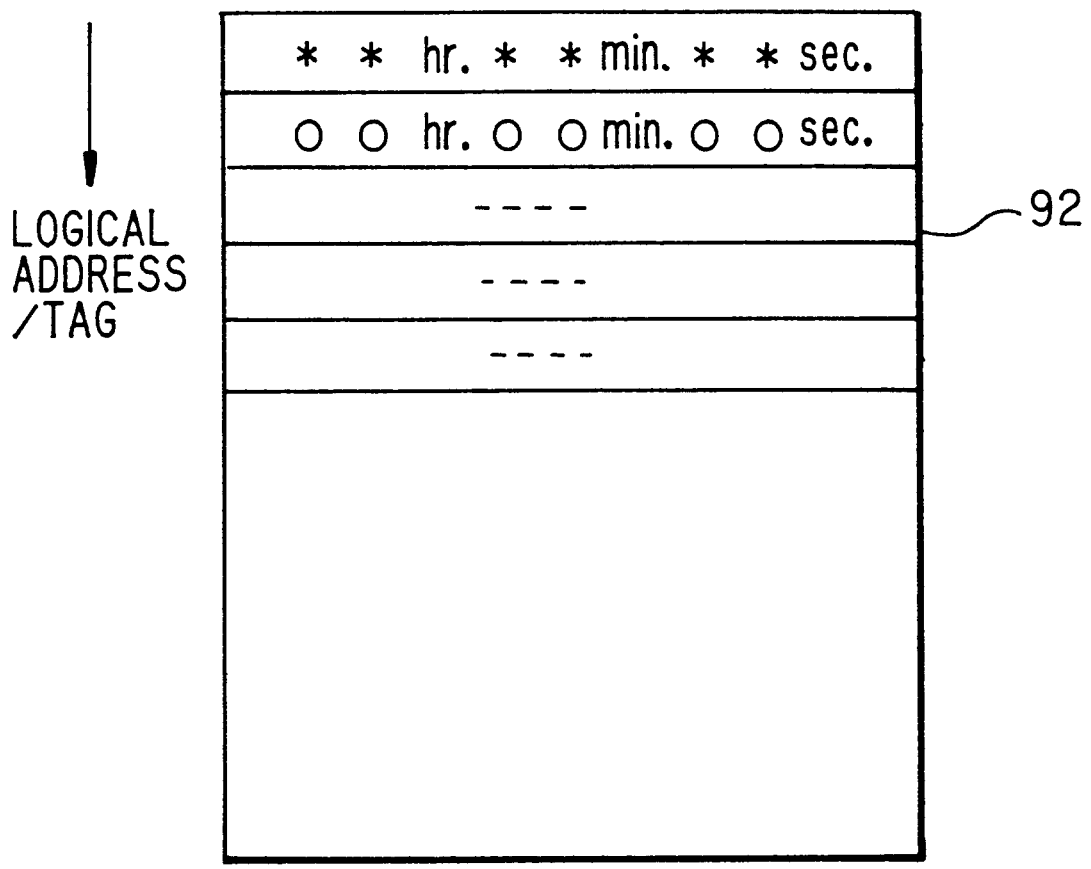
FIG. 12 is a diagram for describing a last-arrival-time storage unit according to the second embodiment.

As shown in FIG. 11, the entry table 76 has VPI/VCI/tag values, which are combinations of VPI/VCI values (logical addresses) and tags, as addresses and stores, on a per-call (VPI/VCI/tag) basis, FIFO numbers FFN, which are for specifying into which of the FIFO buffers a cell is to be entered, and flags FG indicating the cell allocation standard. As shown in FIG. 12, the last-arrival-time storage unit 92 has VPI/VCI/tag values as addresses and stores, for every call (VPI/VCI/tag), the last cell arrival time of the call.

When the cell of a prescribed call has arrived, the selector 95 refers to the FIFO number FFN of this call, the flag FG indicating the cell allocation standard and the magnitudes of the cell interval T and set time period Ts and generates an enable/disable signal in accordance with the following conditions:

(1) When the flag FG is "0", the selector 95 generates an enable/disable signal in such a manner that the cell will be entered into whichever of the FIFO buffers 62a, 62b is designated by the FIFO number FFN read out of the entry table 76.

(2) When the flag FG is "1" and the cell interval T is equal to or less than the set time period Ts, the selector 95 generates an enable/disable signal in such a manner that the cell will be entered into whichever of the FIFO buffers 62a, 62b is designated by the FIFO number FFN read out of the entry table 76.

(3) When the flag FG is "1" and the cell interval T is greater than the set time period Ts, the selector 95 generates an enable/disable signal in such a manner that the cell will be entered into whichever FIFO buffer has the smaller resident cell count.

(b-3) FIFO decision processing for queuing cells

Figure 13:
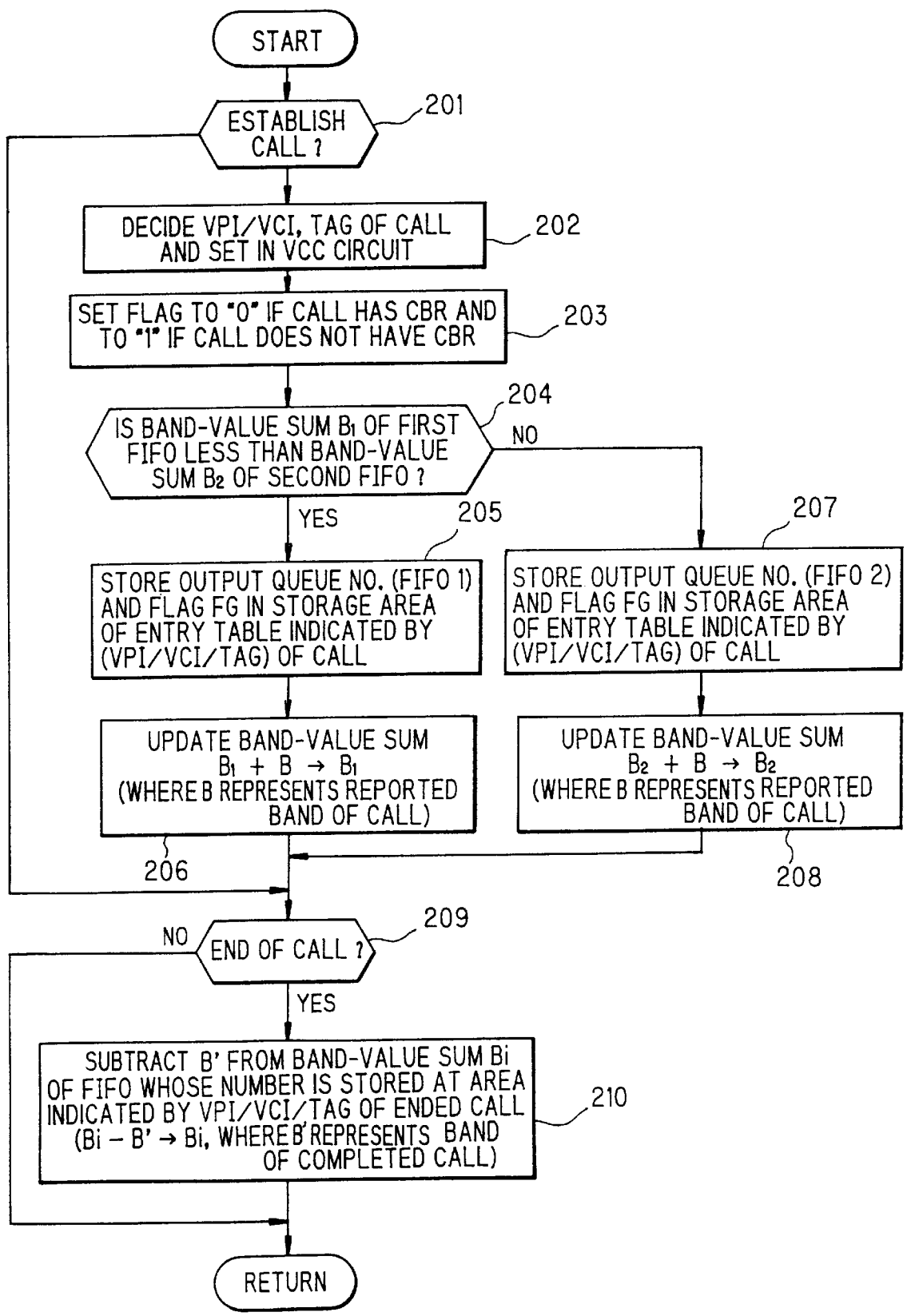
FIG. 13 is a flowchart of processing for deciding a FIFO buffer which is to queue cells according to the second embodiment.

FIG. 13 is a flowchart of processing executed by the call processor 55 to decide the cell queuing FIFO.

The call processor 55 determines whether call establishment processing is required (step 201). If such processing is required, the call processor 55 executes call establishment processing to decide the VPI/VCI values and the tag of the call and sets these in the VC conversion table of the VCC circuit 56 (FIG. 5) (step 202). As a result, the VCC circuit 56 is capable of adding the tag onto the cell that has entered from the transmission line and of replacing the VPI/VCI. Next, the call processor 55 decides the flag FG indicating the cell allocation standard. For example, the call processor 55 sets the flag FG to "0" with regard to a call having a CBR (constant bit rate) lower than the basic switching rate, and to "1" with regard to a call having a VBR (variable bit rate), which possibly may exceed the basic switching rate, or a bursty call (step 203).

Next, the call processor 55 compares the magnitudes of the band-value sum B1 of the first FIFO buffer 62a and the band-value sum B2 of the second FIFO buffer 62b and determines whether B1<B2 holds (step 204).

If B1<B2 holds, the call processor writes the FIFO number FFN of the FIFO buffer 62a and the flag FG decided at step 203 in the storage area of the entry table 76 indicated by the VPI/VCI/tag of the call (step 205) and updates the band-value sum B1 by the operation B1+B→B1 (step 206). If B1>B2 holds, on the other hand, the call processor writes the FIFO number of the FIFO buffer 62b and the flag FG in the storage area of the entry table 76 indicated by VPI/VCI/tag of the call (step 207) and updates the band-value sum B2 by the operation B2+B→B2 (step 208).

If it is decided that call establishment processing is not required at step 201, the call processor determines whether a call currently in progress has ended (step 209). If the call has not ended, the program returns to the beginning and processing is repeated. If the call in progress has ended, the call processor subtracts B' from the band-value sum Bi of the FIFO buffer indicated by the FIFO number that has been stored in the storage area of the entry table 76 indicated by the VPI/VCI/tag of the ended call (Bi−B'→Bi; step 210), the program returns to the beginning and the call processor repeats the above-described processing. It should be noted that B' represents the reported band of the call that has ended.

(b-4) Operation of cell demultiplexer/queuing unit

When a cell enters from the cell terminator 61 (FIG. 9), the mask register 74 (FIG. 10) outputs, as an address, the VPI/VCI/tag that has been added onto this cell. As a result, the FIFO number FFN and flag FG are read out of the entry table 76 from the storage location indicated by this address and are stored in the output register 77. Further, the last cell arrival time To is read out of the last-arrival-time storage unit 92 from the storage located indicated by the above-mentioned address. If the flag FG is "0", the selector 95 generates an enable signal in such a manner that the cell will be entered into the FIFO buffer designated by the FIFO number FFN read out of the entry table 76 so that write clock is applied to the FIFO buffer. As a result, the cell is written to the FIFO buffer to which the write clock has been applied.

If the flag FG is "1" (Condition 1 satisfied), the arithmetic unit 93 calculates the cell interval T (=Tn −T$_0$) based upon the difference between the last cell arrival time T$_0$ and the present time Tn and compares the magnitudes of the cell interval T and a set time period Ts.

If the inequality (cell interval T)>(set time period Ts) holds (Condition 2 satisfied), then, based upon the results of the comparison, the selector 95 generates an enable signal in such a manner that the cell will be entered into whichever FIFO buffer has the smaller resident cell count. As a result, the cell is written to the FIFO buffer to which the write clock has been applied. At the same time, the designated FIFO buffer number is converted (decoded) to a numerical value by a decoder 100 so that the FIFO number in the entry table is updated.

If the relation (cell interval T)≦(set time period Ts) holds (Condition 2 not satisfied), the selector 95 generates an enable/disable signal in such a manner that the cell will be entered into the FIFO buffer designated by the FIFO number FFN read out of the entry table 76. The write clock is entered into this FIFO buffer. As a result, the cell is written to the FIFO buffer to which the write clock has been applied.

Thus, it is so arranged that if the cell interval is greater than the set time period, the cell is stored in the FIFO buffer for which the number of resident cells is smaller. As a result, cells can be allocated in such a manner that cells will not overflow from the FIFO buffers 24a, 24b (i.e. in such a manner that cells will not be lost) and in such a manner that the phenomenon in which the cell arrival order and cell output sequence reverse will not occur.

(b-5) Modification

The foregoing relates to a case in which the flag FG is used. However, cells can be allocated without using the flag FG. Specifically, when a cell has arrived, the selector 95 (FIG. 10) would operate in the following manner:

(1) When the relation (cell interval T)≦(set time period Ts) holds, the selector 95 generates an enable/disable signal in such a manner that the cell will be entered into the FIFO buffer designated by the FIFO number FFN read out of the entry table 76.

(2) When the relation (cell interval T)>(set time period Ts) holds, the selector 95 generates an enable/disable signal in such a manner that the cell will be entered into whichever FIFO buffer has the smaller resident cell count.

(c) Cell multiplexer (CELL-MUX)

The cell multiplexer according to the second embodiment has a construction the same as that of the first embodiment shown in FIG. 7. The cell multiplexer multiplexes two cell streams of the basic switching rate that arrive from the cell switches 51a, 51b and sends the cells to the high-speed transmission line via the physical terminator at the rate of 1.2 Gbps in the order of cell arrival.

(C) Third embodiment (a) Overview of the third embodiment

In the first embodiment, loss of cells will occur if cells conforming to a prescribed call arrive at a rate higher than the basic switching rate. Accordingly, the second embodiment is so adapted that if the cell interval is greater than the set time period, the cell will be entered into the FIFO buffer having the smaller resident cell count. As a result, loss of cells does not occur and neither does the reversal phenomenon, namely the reversal of the cell arrival order and cell output order.

In accordance with the third embodiment, described below, all cells unconditionally enter the FIFO buffer having the smaller resident cell count. Since the reversal phenomenon occurs in such case, a rearranging operation is performed in multiplexing processing so that cells will be transmitted in the order in which they arrived.

Figure 14:
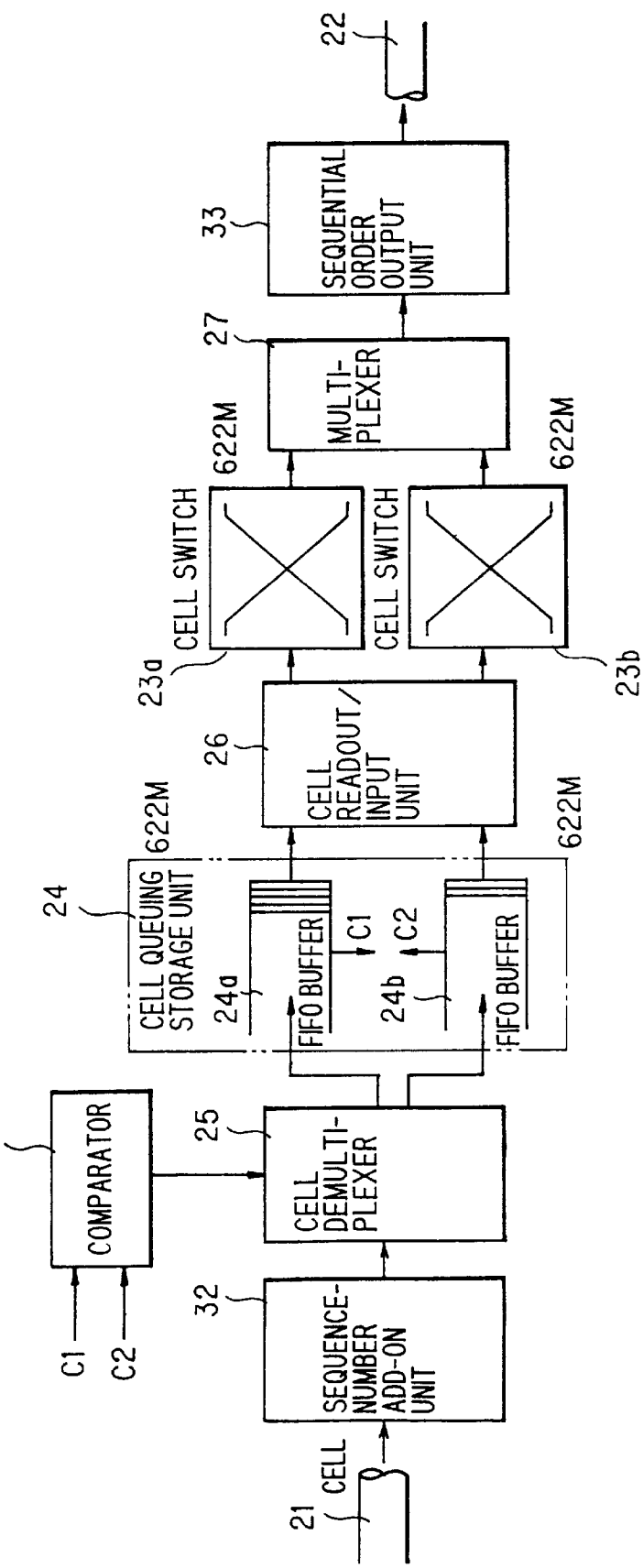
FIG. 14 is a block diagram for describing an overview of a third embodiment of the present invention.

FIG. 14 is a diagram for describing the principle of the third embodiment of the present invention. Elements in FIG. 14 identical with those shown in FIG. 1 are designated by like reference characters. The arrangement of the third embodiment includes the comparator 30 for comparing the magnitudes of cell counts C1, C2 representing the numbers of cells residing in the FIFO buffers 24a, 24b, respectively, a sequence-number add-on unit 32 which, whenever a cell arrives from the transmission line, adds a sequence number onto the cell on a per-call basis, and a sequential order output unit 33 for transmitting cells upon arranging the cells in the order of the sequence numbers on a per-call basis.

The cell switches 23a, 23b which operate at the basic switching rate are provided and so are the FIFO buffers 24a, 24b, which correspond to the cells switches 23a, 23b, respectively, for queuing cells from the high-speed transmission line 21. The comparator 30 compares the resident cell counts C1, C2 of the respective FIFO buffers 24a, 24b, discriminates the FIFO buffer having the smaller number of stored cells and applies its output to the cell demultiplexer 25.

Whenever a cell stream having a transmission rate of 1.2 Gbps arrives via the transmission line 21, the sequence-number add-on unit 32 adds sequence numbers, which indicate the order of cell arrival, onto the cells according to call. The cell demultiplexer 25 enters a cell having the attached sequence number into whichever FIFO buffer has the smaller resident cell count. The cell readout/input unit 26 reads cells out of the each of the FIFO buffers 24a, 24b at the basic switching rate of 622 Mbps and enters the cells into the corresponding cell switches 23a, 23b. The cell switches 23a, 23b switch the entered 622-Mbps cells, the multiplexer 27 multiplexes the 622-Mbps cells switched by the switches 23a, 23b, and the sequential order output unit 33 sends the multiplexed 1.2-Gbps cells to the transmission line 22 upon arranging the cells in the order of the sequential numbers on a per-call basis.

If the arrangement described above is adopted, cells can be allocated to the FIFO buffer of the smaller resident cell count unconditionally with out regard to the cell interval. Even if the system accommodates a high-speed transmission line, therefore, cells will not overflow from the FIFO buffers 24a, 24b and loss of cells will not occur. In addition, even if the reversal phenomenon occurs, cells can be sent to the transmission line upon being rearranged using the sequence numbers.

(b) Cell demultiplexing/queuing unit (CELL-DMUX)

(b-1) Construction

Figure 15:
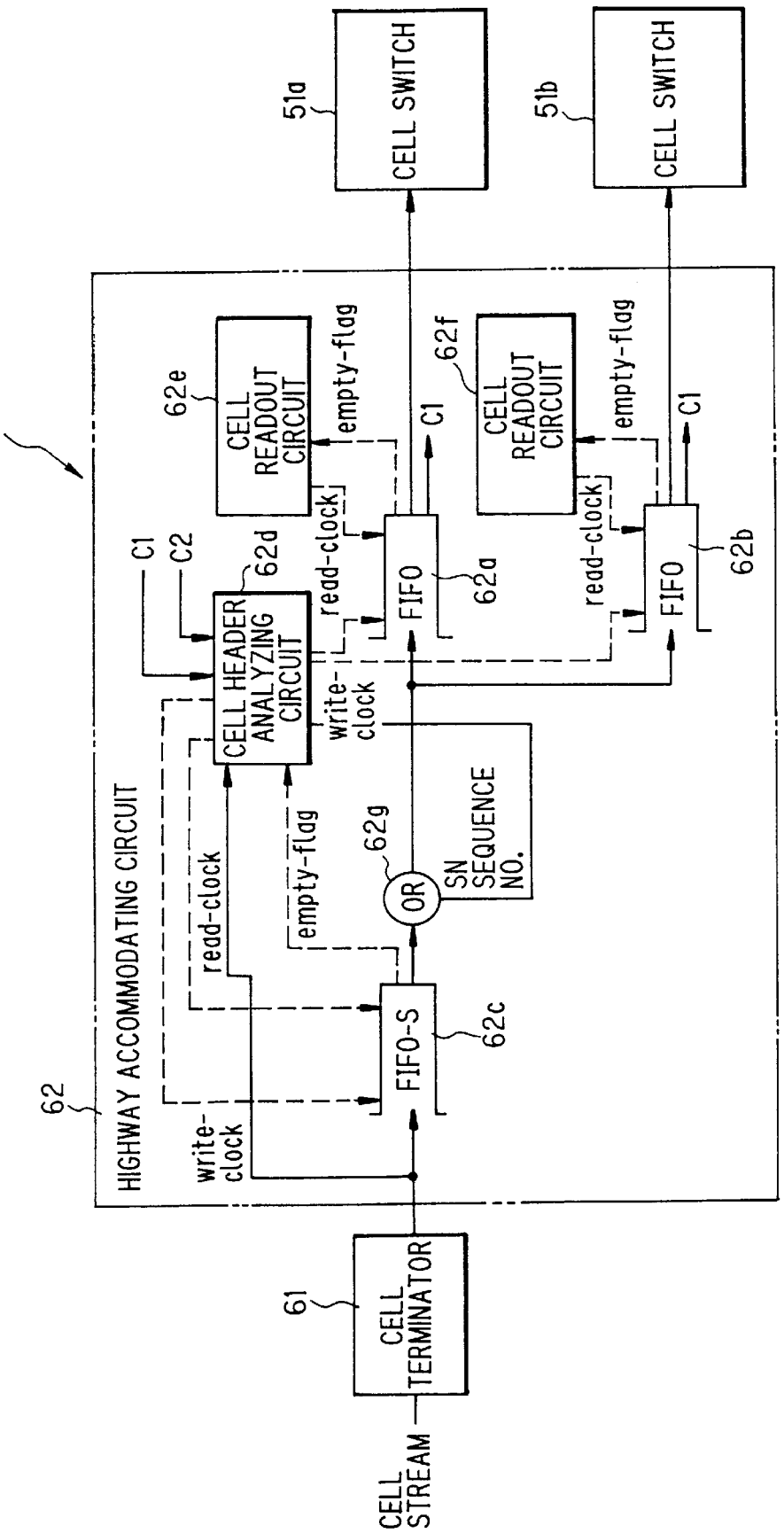
FIG. 15 is a block diagram showing the construction of a cell demultiplexing/queuing unit according to the third embodiment.

FIG. 15 is a block diagram showing the construction of the cell demultiplexing/queuing unit 52a-2 according to the third embodiment. As shown in FIG. 15, the unit 52a-2 includes the cell terminating circuit 61 for verifying the normality of cells, and the highway accommodating circuit 62 for separating the cell rate from the transmission line into the basic switching rates of the cell switches 51a, 51b. The transmission rate of the high-speed transmission line is 1.2 Gbps, and the basic switching rate is 622 Mbps. For this reason, the two cell switches 51a, 51b are provided in correspondence with the high-speed transmission line.

The highway accommodating circuit 62 has the two FIFO buffers 62a, 62b, the delay circuit 62c, which is constituted by a FIFO memory, the cell header analyzing circuit 62d, the cell readout circuits 62e, 62f and a sequence-number added-on unit 62g. The FIFO buffers 62a, 62b are provided in correspondence with the cell switches and queue the multiplexed cells. The delay circuit 62c delays, for a time Td measured from the moment at which the write clock is generated, the time at which the read clock is generated, thereby delaying, by the time Td, the cells output from the cell terminator 61. The cell header analyzing circuit 62d analyzes cell headers, generates continuous sequence numbers SN on a per-call basis and controls the allocation of cells to the FIFO buffers 62, 62b. The cell readout circuits 62e, 62f read cells out of the FIFO buffers 62a, 62b at the basic switching rate and enter the cells into the corresponding cell switches. The sequence-number add-on unit 62g adds the sequence number SN onto the cell header of a cell.

A prescribed period of time is necessary for the cell header analyzing circuit 62d to generate the sequence number SN. The delay circuit 62c, therefore, delays the cells for this period of time and the sequence-number add-on unit 62g adds the serial number SN onto the cell header. In addition to generating the sequence number SN, the cell header analyzing circuit 62d obtains whichever of the FIFO buffers 62a 62b has the smaller resident cell count, decides the FIFO buffer to which the cell into which the cell is to be entered and applies the 1.2-GHz write clock to the FIFO buffer. The FIFO buffers 62a, 62b enter the empty signal empty-flag, which indicates whether the FIFO buffer has stored a cell, to the corresponding cell readout circuits 62e, 62f and enter the resident cell counts C1, C2 into the cell header analyzing circuit 62d. If cells have been stored, the cell readout circuits 62e, 62f generate the readout clocks read-clock having the basic switching rate of 622 Mbps, so that cells are read out of the FIFO buffers and entered into the cell switches 51a, 51b in sync with the clock.

(b-2) Cell header analyzing circuit

Figure 16:
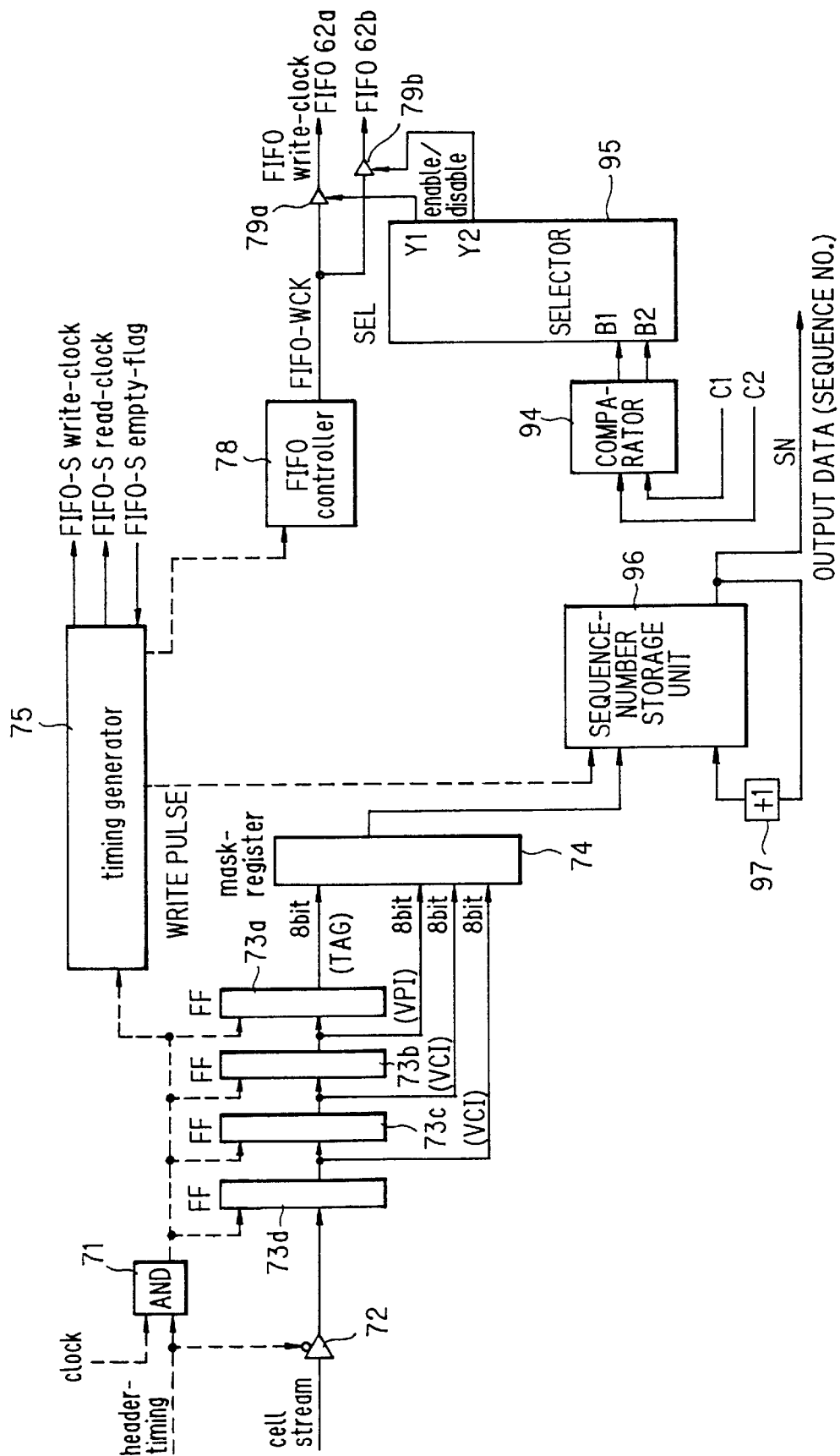
FIG. 16 is a diagram illustrating the construction of a cell header analyzing circuit according to the third embodiment.

FIG. 16 is a diagram illustrating the construction of the cell header analyzing circuit 62d. The circuit includes the AND gate 71 for passing the clock for the duration of a cell header, the gate 72 for passing the cell header, the registers 73a~73d for holding the tag and the VPI/VCI values that have been added onto the cell header, the mask register 74 for selecting and outputting a prescribed VPI/VCI/tag as an address, the timing generator 75, a FIFO controller 78 for generating the write clock applied to the FIFO buffers, and the gate circuits 79a, 79b for outputting the write clock to the FIFO buffers 62a, 62b at input of the enable signal. The cell header analyzing circuit 62d further includes the comparator 94 for comparing the magnitudes of the resident cell counts C1, C2 of the FIFO buffers 62a, 62b, the selector 95 for generating the enable signal and applying it to the gate circuits 79a, 79b in such a manner that the cell will be entered into the FIFO buffer having the smaller resident cell count, a sequence-number storage unit 96, which is addressed by the VPI/VCI/tag value, for storing the sequence number SN for every call (VPI/VCI/tag), and a +1 adder 97.

(b-3) Operation of cell demultiplexer/queuing unit

The VPI/VCI values and the tag decided at the time of call establishment are added onto the header of the cell output from the cell terminator 61. The cell header analyzing circuit 62d reads the sequence number SN out of the sequence-number storage unit 96 using the VPI/VCI values and the tag as the address and enters this sequence number SN into the sequence-number add-on unit 62g. Further, the cell header analyzing circuit 62d increments the sequence number SN by one count and writes it to the above-mentioned address to update the same, compares the magnitudes of the resident cell counts of the FIFO buffers 62a, 62b and enters the write clock into the FIFO buffer having the smaller resident cell count.

The sequence-number add-on unit 62g adds the sequence number onto the header output from the delay circuit 62c and then outputs the sequence number so that the FIFO buffer to which the write clock is being applied will write in the cell.

As a result of the foregoing operation, sequence numbers are added onto cells for every call (VPI/VCI/tag) in the order of arrival and the cells are written to the FIFO buffer having the smaller resident cell count. In concurrence with the write operation, the cell readout circuits 62e, 62f read out the cells, which have been stored in the FIFO buffers 62a, 62b, at the basic switching rate and enter the cells into the cell switches 51a, 51b, respectively. As a result, the cell switches 51a, 51b switch the input cells based upon the tags and output the cells to the prescribed paths.

(c) Cell multiplexer (CELL-MUX) and sequential order output unit

Figure 17:
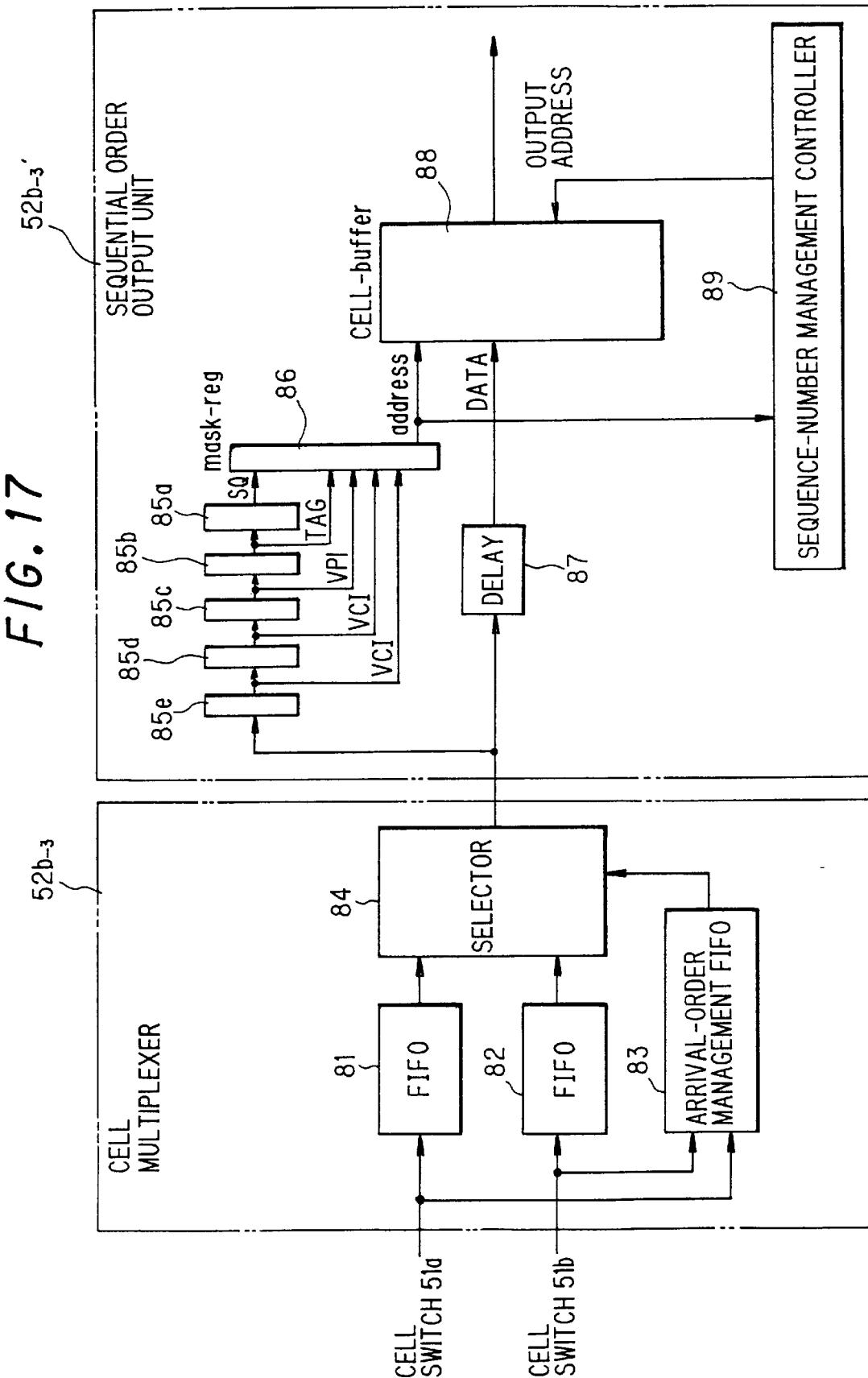
FIG. 17 is a block diagram illustrating the construction of a cell multiplexer and sequential order output unit according to the third embodiment.

FIG. 17 is a block diagram illustrating the construction of the cell multiplexer and the sequential order output unit according to the third embodiment. The cell multiplexer is shown at 52b-3 and the sequential order output unit at 52b-3'.

The cell multiplexer 52b-3 includes the first FIFO buffer 81 for writing in cells of the basic switching rate (622 Mbps) output from the first cell switch 51a, the second FIFO buffer 82 for writing in cells of the basic switching rate (622 Mbps) output from the second cell switch 51b, the cell-arrival order management FIFO 83 for storing the FIFO numbers of the FIFO buffers, to which cells have been written, in the order in which the cells were written to the first and second FIFO buffers, and the selector 84 which, in accordance with the cell arrival order, reads cells out of the first and second FIFO buffers 81, 82 at the transmission rate of 1.2 Gbps.

The sequential order output unit at 52b-3' includes registers 85a~85e for storing a sequence number SQ, tag and VPI/VCI values contained in a cell header, a mask register 86 for outputting VPI/VCI/tag as the higher order bits of an address and the sequence number SQ as the lower order bits of the address, a delay circuit 87 for delaying a cell until an address is output from the mask register, a cell buffer 88 for storing a cell in a storage area designated by the address specified by the VPI/VCI/tag/sequence number, and a sequence-number management controller 89.

The cell multiplexer 52b-3 multiplexes the switched cells and the sequential order output unit 52b-3' arranges the cells in the order of the sequence numbers on a per-call (VPI/VCI/tag) basis and transmits the cells of each call in sequential order. More specifically, the cell buffer 88 stores cells in order of increasing VPI/VCI/tag and, for every VPI/VCI/tag (call), in order of the sequence numbers. Further, the sequence-number management controller 89 stores the higher order addresses (VPI/VCI/tag) in the order in which cells arrive from the cell multiplexer 52b-3 and generates addresses in the order of the higher order addresses (VPI/VCI/tag) that have been stored and in the order of the sequence numbers so that cells are read out of the cell buffer 88 and delivered as the output.

Figure 18:
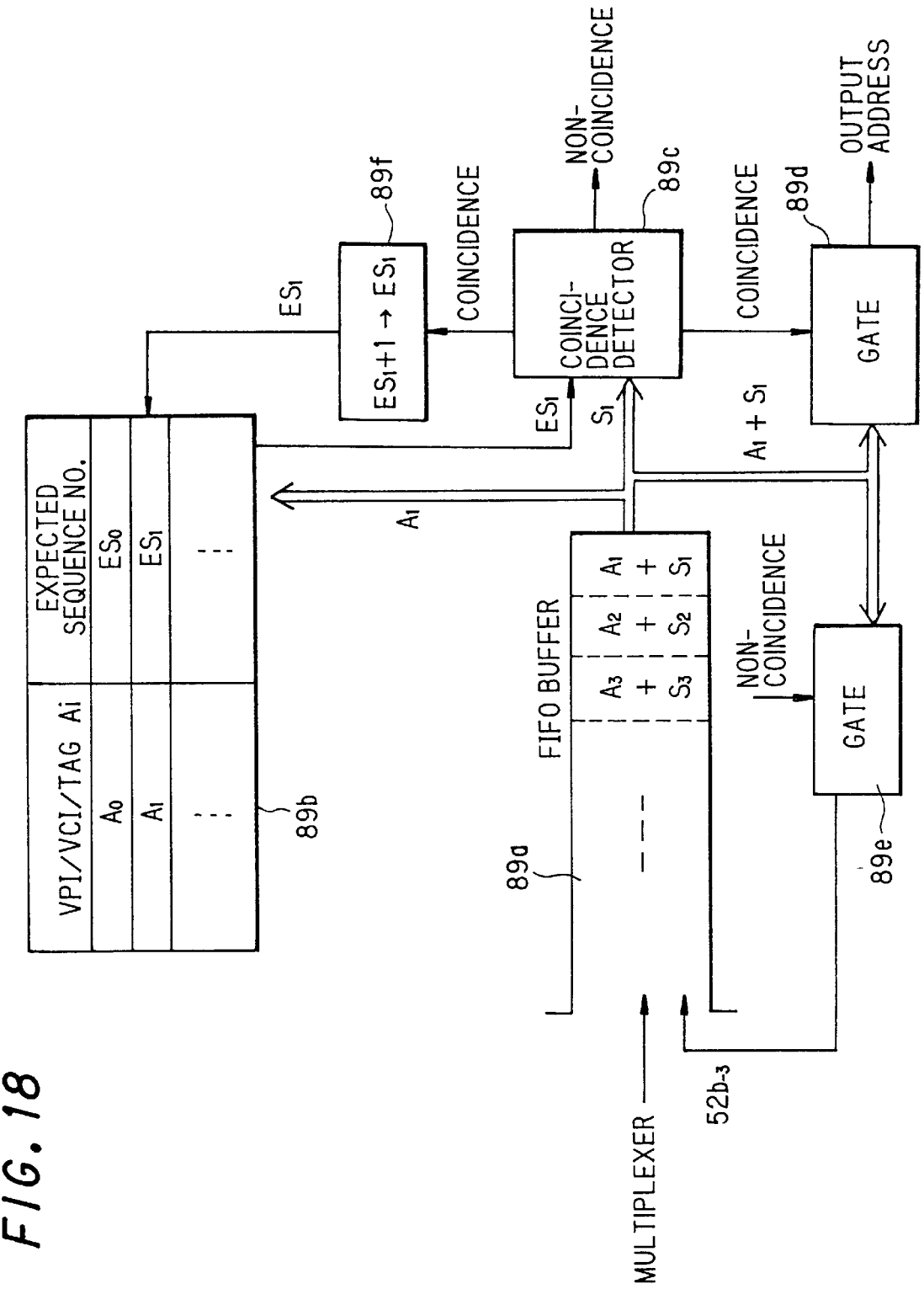
FIG. 18 is a block diagram illustrating the construction of a sequence-number management control unit according to the third embodiment.
Figure 19:
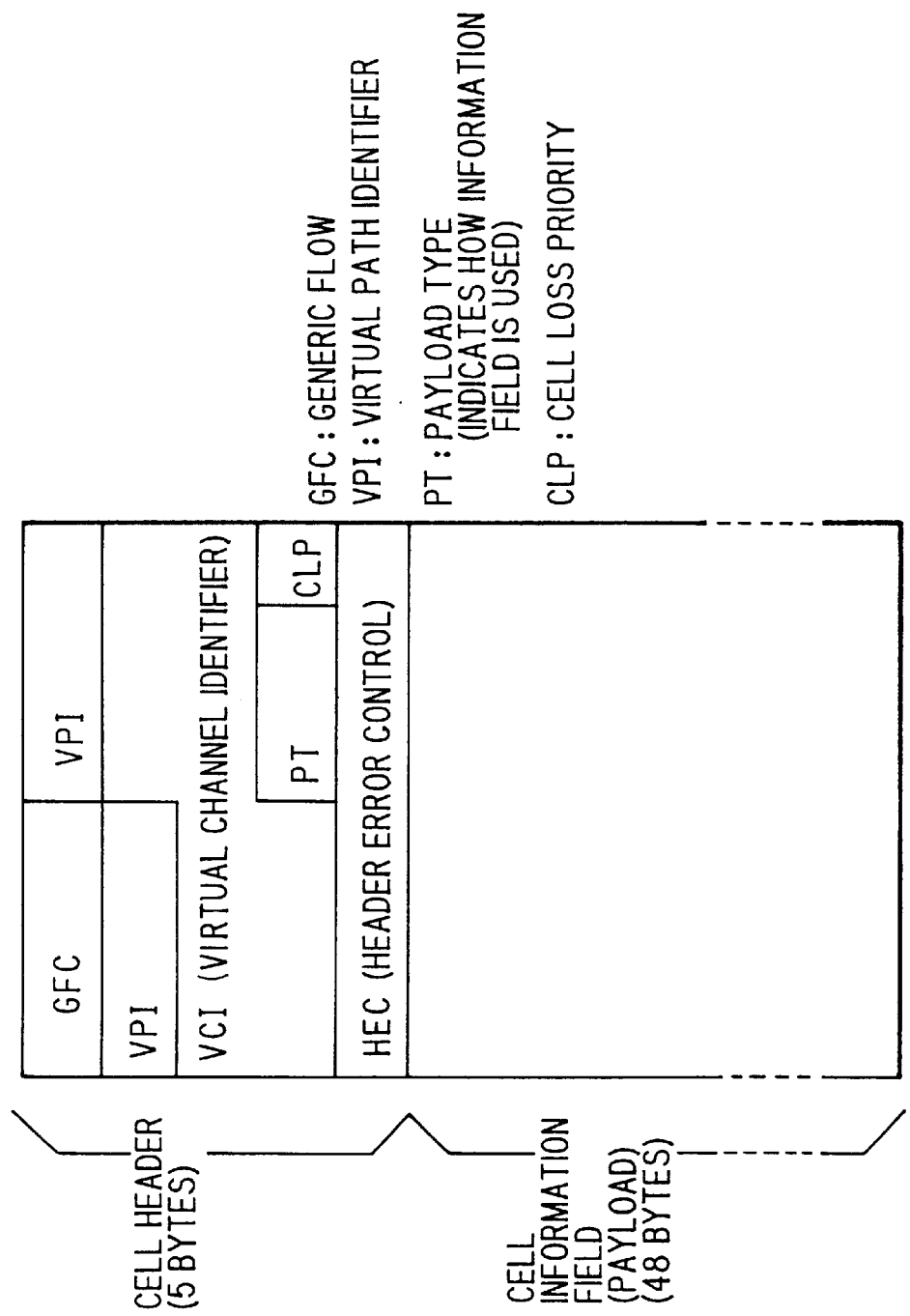
FIG. 19 is a diagram for describing an ATM cell format.
Figure 20:
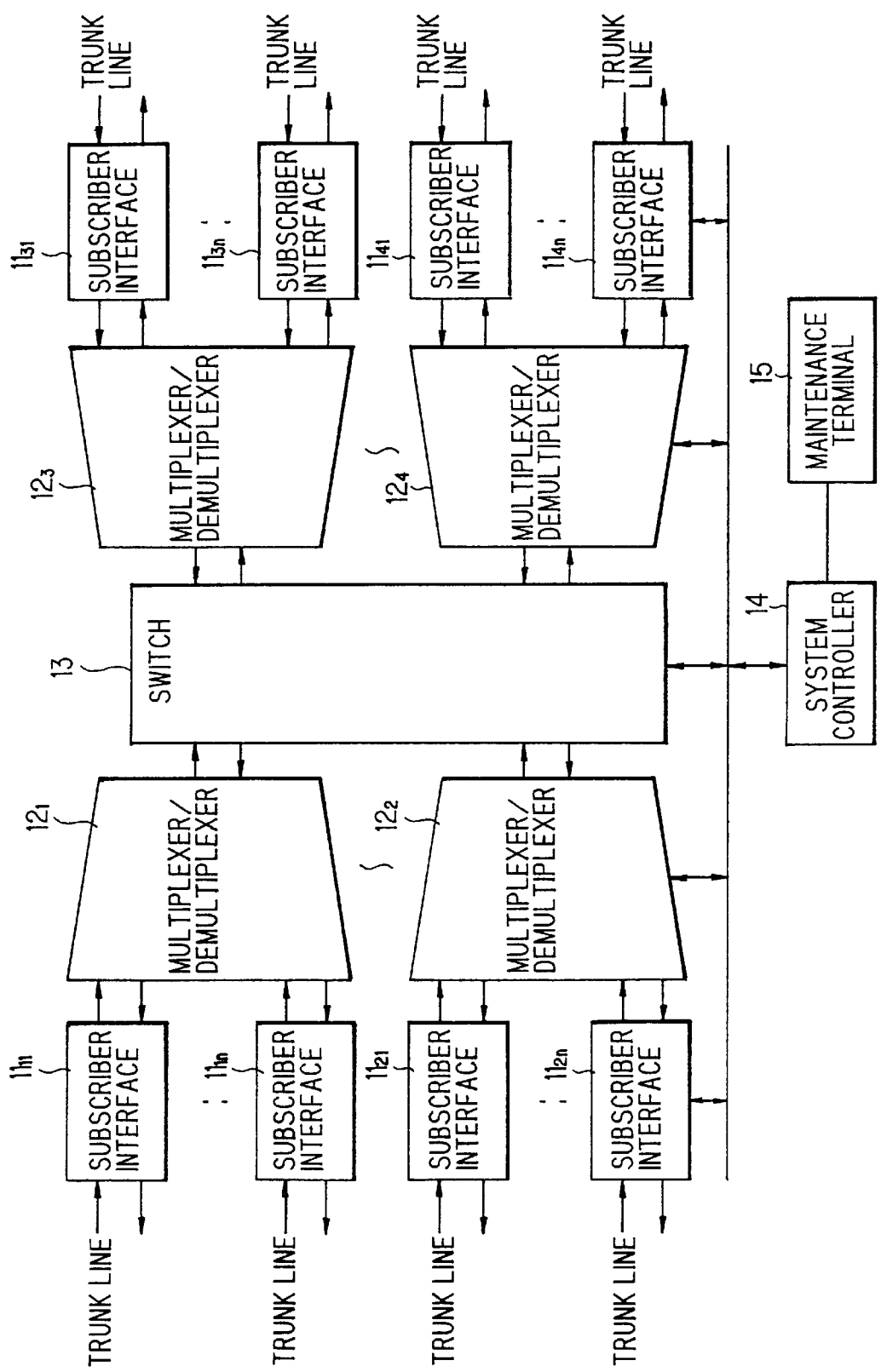
FIG. 20 is a block diagram illustrating the configuration of an ATM switching system.
Figure 21:
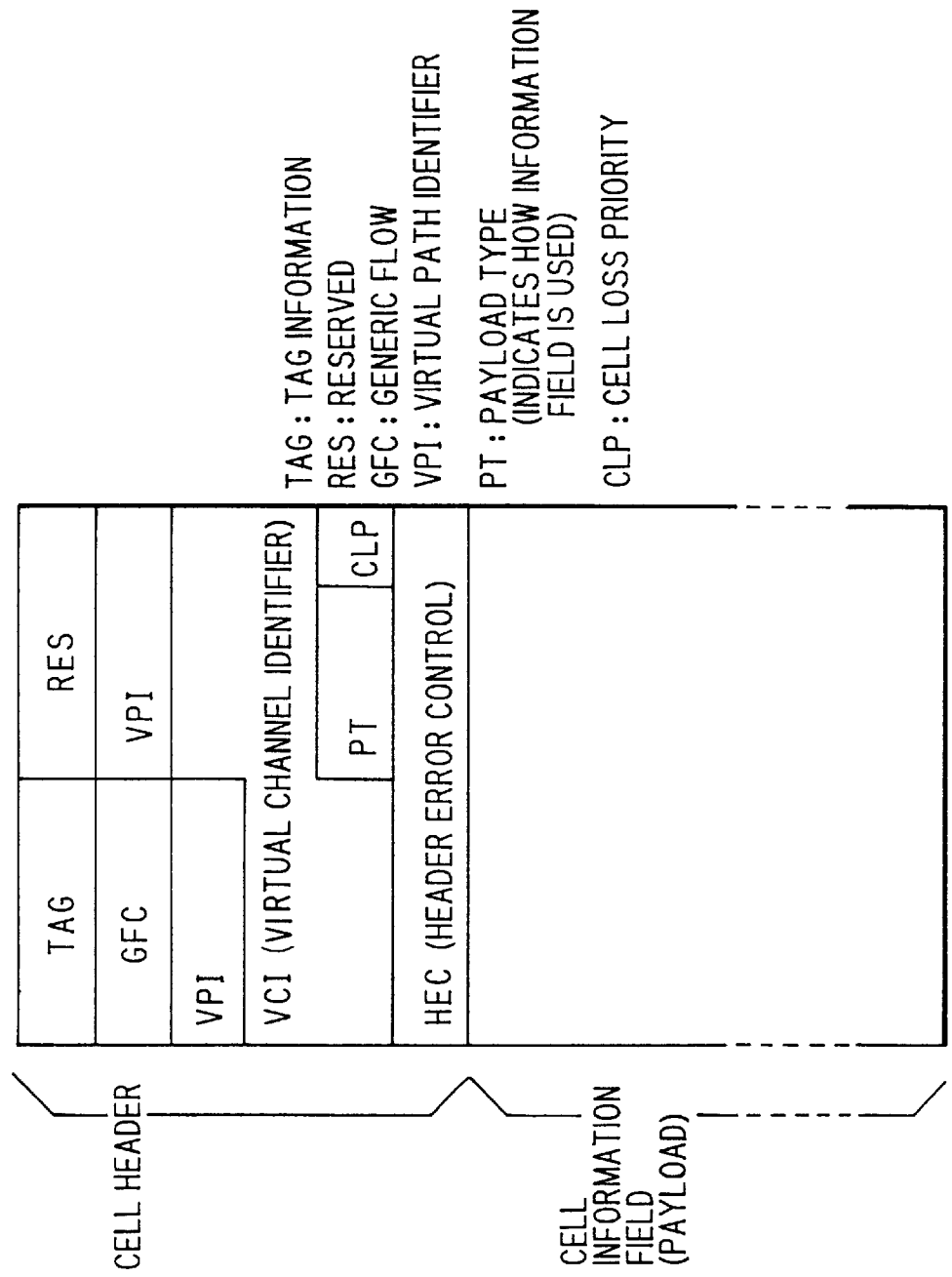
FIG. 21 is a diagram showing cell format within a switch.

FIG. 18 is a block diagram illustrating the construction of the sequence-number management control unit 89. The sequence-number management controller 89 includes a FIFO buffer 89a for storing addresses (VPI/VCI/tag/sequence number) in the order in which cells arrive from the cell multiplexer 52b-3, wherein a higher order address Ai is represented by VPI/VCI/tag and a lower order address Si by the sequence number, a table 89b for storing a sequence number ESi (an expected sequence number), which is to be sent to the transmission line next, for every higher order address Ai (VPI/VCI/tag), a coincidence detector 89c for detecting coincidence or non-coincidence between the expected sequence number ESi, which corresponds to the higher order address Ai that has been read out of the FIFO buffer 89a, and the lower order address Si that has been read out of the FIFO buffer 89a, a gate circuit 89d for entering the address (VPI/VCI/tag/sequence number), which has been read out of the FIFO buffer 89a, into the cell buffer 88 as an output address in response to detection of coincidence, a gate circuit 89e for writing the address (VPI/VCI/tag/sequence number) to the FIFO buffer 89a in response to detection of non-coincidence, and an adding circuit 89f for counting up the expected sequence number ESi.

When the leading address (VPI/VCI/tag/sequence number) is read out of the FIFO buffer 89a, the expected sequence number ESi corresponding to the higher order address Ai enters the coincidence detector 89c from the table 89b. The coincidence detector 89c compares the expected sequence number ESi and the lower order address Si read out of the FIFO buffer 89a. Since the reversal phenomenon is not occurring if the two coincide, the coincidence detector 89c sends the gate circuit 89d an indication of coincidence so that the address (VPI/VCI/tag/sequence number) is immediately entered into the cell buffer 88 as the output address. As a result, the cell designated by this output address is read out of the cell buffer 88 and entered into the physical terminator, which is the next stage of the circuitry. Further, the adder 89e increments the expected sequence number ESi (i.e. performs the operation ESi+1→ESi) and stores the result at the original location, thereby updating the expected sequence number.

If the expected sequence number ESi and the lower order address Si do not coincide, on the other hand, then the reversal phenomenon is occurring. In such case the cell buffer 88 does not output a cell and the coincidence detector 89c sends the gate circuit 89e an indication of non-coincidence. In response, the gate circuit 89e writes the address (VPI/VCI/tag/sequence number) to the FIFO buffer 89a again. The expected sequence number ESi is not updated. The control described above is then repeated for the next address.

In the case described above, the transmission rate of the high-speed transmission line is assumed to be 1.2 Gbps, the basic switching rate is assumed to be 622 Mbps, and two cell switches and two FIFO buffers are provided in correspondence with the high-speed transmission line. However, a prescribed number of cell switches and FIFO buffers may be provided in dependence upon the transmission rate and basic switching rate. For example, if the transmission rate is 2.4 Gbps and the basic switching rate is 622 Mbps, then four cell switches and four FIFO buffers would be provided in correspondence with the high-speed transmission line and control similar to that described above would be carried out.

Further, the combination of VPI/VCI values and a tag (VPI/VCI/tag) is employed as the address of the entry table, etc. However, if a call is capable of being distinguished, it can be used as the address. For example, an address may consist solely of the VPI/VCI values.

Thus, in accordance with the present invention, a plurality of cell switches of the basic switching rate are provided for a high-speed transmission line whose transmission rate is higher than the basic switching rate, and means for queuing cells from the transmission line are provided in correspondence with each cell switch. It is so arranged that cells from the transmission line are demultiplexed and written to the prescribed queuing means, cells are read out of each of the queuing means at the basic switching rate and entered into the corresponding cell switch, and cells switched by each of the cell switches are multiplexed and sent to a transmission line. As a result of this arrangement, it is possible for an exchange system to be made to accommodate a high-speed transmission line having a transmission rate higher than the basic switching rate of a cell switch. Further, it is possible for an exchange system to be made to accommodate a high-speed transmission line by changing only the high-speed transmission line accommodating portion without altering the cell switch. Furthermore, it is possible for an exchange system to be made to accommodate transmission lines having various transmission rates from a low transmission rate to a transmission rate higher than the basic switching rate. This makes it possible to provide a versatile exchange system.

In accordance with the present invention, it is so arranged that correspondence is established between a call and queuing means by using VPI/VCI values or VPI/VCI/tag values that were allocated to the call at the time of call establishment. By referring to the VPI/VCI values or VPI/VCI/tag values that have been added onto a cell, the cell is connected to the queuing means corresponding to this call. As a result, cells can be allocated to each of the queuing means evenly so that cells will not overflow from the queuing means, namely from the FIFO buffer, and will not be lost.

In accordance with the present invention, it is so arranged that correspondence is established between a call and queuing means by using VPI/VCI values or VPI/VCI/tag values that were allocated to the call at the time of call establishment. It is so arranged that in a case where the cell interval of a prescribed call is greater than a set time period, the cell of this call is connected to the queuing means (FIFO buffer) for which the number of connected cells is smallest, whereas if the cell interval is equal to or less than the set time period, the cell is connected to the queuing means corresponding to the call. As a result, the reversal phenomenon will not occur, cells can be allocated to each of the queuing means evenly and, even if cells whose transmission rate is higher than the basic switching rate arrive, these cells can be switched correctly.

In accordance with the present invention, a plurality of cell switches of the basic switching rate are provided for a high-speed transmission line whose transmission rate is higher than the basic switching rate, and means for queuing cells from the transmission line are provided in correspondence each cell switch. Whenever a cell arrives from the transmission line, a sequence number indicating the order of cell arrival is added onto the cell on a per-call basis, the cell onto which this sequence number has been added is connected to the queuing means for which the number of connected cells is smallest, and cells are read out of each of the queuing means at the basic switching rate and entered into the corresponding switching means, whereby the cells are switched. When the switched cells are multiplexed and sent to the transmission line, the cells are sent to the transmission line upon being arranged in the order of the sequence numbers on a per-call basis. As a result, cells can be allocated to each of the queuing means evenly and, even if cells whose transmission rate is higher than the basic switching rate arrive, these cells can be switched correctly.

As many apparently widely different embodiments of the present invention can be made without departing from the spirit and scope thereof, it is to be understood that the invention is not limited to the specific embodiments thereof except as defined in the appended claims.

What is claimed is:

1. A cell switching method in a cell exchange system, comprising the steps of:

providing a plurality of cell switches that operate at a basic switching rate;

providing a plurality of queuing means that correspond to respective ones of the cell switches for queuing cells from an input transmission line;

providing demultiplexing means and demultiplexing cells from the input transmission line and connecting said demultiplexing means to said queuing means for transmitting the demultiplexed cells to prescribed queuing means based upon header information of the cells;

reading cells out of each of the queuing means at the basic switching rate and entering the cells into the corresponding cell switch; and providing a multiplexer for multiplexing cells switched by each of the cell switches and sending the multiplexed cells to an output transmission line, further comprising the following steps in order to queue cells in said queuing means:

allocating connection identifier to a call when the call is established and establishing correspondence between the call and said queuing means using the connection identifier allocated; and identifying a call by referring to the connection identifier contained in header information of a cell, and storing, on a per-call basis, the last time a cell arrived at the exchange system;

when a cell of a call has arrived, obtaining a cell arrival interval of the call based upon the difference between said last time and the present time;

if the cell interval is greater than a set time period, obtaining a queuing means for which the connected number of cells is smallest and connecting the cell that has arrived to this queuing means; and if the cell interval is less than a set time period, connecting the cell to the queuing means that corresponds to the call.

2. The method according to claim 1, wherein the input and output transmission lines are high-speed transmission lines having a transmission rate higher than the basic switching rate of the cell switches.

3. The method according to claim 1, further comprising the following steps in order to establish correspondence between a call and said queuing means:

adding up a band value of a call for a predetermined queuing means whenever the call has been correlated with said predetermined queuing means and subtracting a band value from the sum of band values in response to completion of communication of the call;

obtaining a queuing means for which the sum of the band values is smallest at establishment of a call; and correlating a call with the queuing means for which the sum of the band values is smallest.

4. A cell switching method in a cell exchange system, comprising the steps of:

providing a plurality of cell switches that operate at a basic switching rate;

providing a plurality of queuing means that correspond to respective ones of the cell switches for queuing cells from an input transmission line;

providing demultiplexing means and demultiplexing cells from the input transmission line and connecting said demultiplexing means to said queuing means for transmitting the demultiplexed cells to prescribed queuing means based upon header information of the cells;

reading cells out of each of the queuing means at the basic switching rate and entering the cells into the corresponding cell switch; and providing a multiplexer for multiplexing cells switched by each of the cell switches and sending the multiplexed cells to an output transmission line, further comprising the following steps in order to queue cells in said queuing means:

allocating a connection identifier to a call when the call is established and establishing correspondence between the call and said queuing means using the connection identifier allocated; and referring to the connection identifier contained in header information of a cell and connecting the cell to the queuing means corresponding to the call;

further comprising the following steps in order to establish correspondence between a call and said queuing means;

adding up a band value of a call for a predetermined queuing means whenever the call has been correlated with said predetermined queuing means and subtracting the band value from the sum of band values in response to completion of communication of the call;

obtaining a queuing means for which the sum of the band values is smallest at establishment of a call; and correlating a call with the queuing means for which the sum of the band values is smallest.

5. A cell exchange system for switching cells, comprising:

a plurality of cell switches that operate at a basic switching rate;

a plurality of queuing means that correspond to respective ones of the cell switches for queuing cells from an input transmission line;

cell demultiplexing means for identifying a call by referring to header information of a cell, and connecting the demultiplexed cell to the queuing means that corresponds to the call identified;

cell readout means for reading cells out of each said queuing means at the basic switching rate in the order in which the cells arrived; and multiplexing means for multiplexing the cells switched by each of the cell switches and sending the cells multiplexed to an output transmission line;

connected-cell-count monitoring means for monitoring number of cells that have been connected to each of the queuing means;

last-arrival-time storing means for storing, on a per-call basis, last time at which a cell of said call arrived at the cell exchange system;

cell interval discriminating means, when a cell of a call has arrived, for obtaining the arrival interval of the cells of said call based upon a difference between said last time and the present time, and determining whether the cell interval is greater than a set time period; and connecting means, in a case where the cell interval is less than the set time period, for connecting the cell to the queuing means that corresponds to the call, and in a case where the cell interval is greater than the set time period, for obtaining the queuing means for which the count of connected cells is smallest, and connecting the cell to said queuing means.

6. The system according to claim 5, wherein said input and output transmission lines are high-speed transmission lines having a transmission rate higher than the basic switching rate of the cell switches.

7. A cell exchange system for switching cells, comprising:

a plurality of cell switches that operate at a basic switching rate;

a plurality of queuing means that correspond to respective ones of the cell switches for queuing cells from an input transmission line;

cell demultiplexing means for identifying a call by referring to header information of a cell, and connecting the demultiplexed cell to the queuing means that corresponds to the call identified;

cell readout means for reading cells out of each of said queuing means at the basic switching rate in the order in which the cells arrived; and multiplexing means for multiplexing the cells switched by each of the cell switches and sending the cells multiplexed to an output transmission line;

a table for storing corresponding relationships between calls and said plurality of queuing means using connection identifiers that have been set for the calls;

wherein said cell demultiplexing means obtains, from said table, the queuing means that corresponds to a call using the connection identifier contained in the header information of a cell, and connecting the cell to said corresponding queuing means;

means for adding up a reported band of a call for a predetermined queuing means whenever the call has been correlated with said predetermined queuing means and subtracting the reported band from the sum of reported bands in response to completion of communication of the call; and setting means which, when a call has been established, is for setting the call in said table upon correlating said call with the queuing means for which the sum of the reported bands is smallest.

* * * * *